US010313417B2

(12) United States Patent
Chen et al.

(10) Patent No.: US 10,313,417 B2
(45) Date of Patent: Jun. 4, 2019

(54) METHODS AND SYSTEMS FOR AUTO-ZOOM BASED ADAPTIVE VIDEO STREAMING

(71) Applicant: QUALCOMM Incorporated, San Diego, CA (US)

(72) Inventors: Ying Chen, San Diego, CA (US); Dashan Gao, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 242 days.

(21) Appl. No.: 15/433,763

(22) Filed: Feb. 15, 2017

(65) Prior Publication Data
US 2017/0302719 A1    Oct. 19, 2017

Related U.S. Application Data

(60) Provisional application No. 62/324,307, filed on Apr. 18, 2016.

(51) Int. Cl.
*G06F 15/16* (2006.01)
*H04L 29/06* (2006.01)
(Continued)

(52) U.S. Cl.
CPC ........ *H04L 65/604* (2013.01); *H04L 65/4069* (2013.01); *H04N 19/105* (2014.11);
(Continued)

(58) Field of Classification Search
CPC .. H04L 65/604; H04N 19/105; H04N 19/167; H04N 19/174; H04N 19/59
See application file for complete search history.

(56) References Cited

U.S. PATENT DOCUMENTS 8,270,469 B2 * 9/2012 Chui .................... H04N 19/159
                                                    375/240.01
8,832,193 B1    9/2014 Lindberg et al.
(Continued)

FOREIGN PATENT DOCUMENTS

WO    2015197815 A1    12/2015

OTHER PUBLICATIONS

Bashir F., et al., "Collaborative Tracking of Objects in EPTZ Cameras (Invited Paper)", Visual Communications and Image Processing, Jan. 30, 2007, XP030081098, 10 pages.
(Continued)

*Primary Examiner* — Mohamed A. Wasel
(74) *Attorney, Agent, or Firm* — Kilpatrick Townsend & Stockton, LLP

(57) ABSTRACT

Automatic adaptive zoom enables computing devices that receive video streams to use a higher resolution stream when the user enables zoom, so that the quality of the output video is preserved. In some examples, a tracking video stream and a target video stream are obtained and are processed. The tracking video stream has a first resolution, and the target video stream has a second resolution that is higher than the first resolution. The tracking video stream is processed to define regions of interest for frames of the tracking video stream. The target video stream is processed to generate zoomed-in regions of frames of the target video stream. A zoomed-in region of the target video stream corresponds to a region of interest defined using the tracking video stream. The zoomed-in regions of the frames of the target video stream are then provided for display on a client device.

30 Claims, 12 Drawing Sheets

(51) Int. Cl.
*H04N 19/105* (2014.01)
*H04N 19/162* (2014.01)
*H04N 19/167* (2014.01)
*H04N 19/33* (2014.01)
*H04N 19/174* (2014.01)
*H04N 19/59* (2014.01)

(52) U.S. Cl.
CPC ......... *H04N 19/162* (2014.11); *H04N 19/167* (2014.11); *H04N 19/33* (2014.11); *H04N 19/174* (2014.11); *H04N 19/59* (2014.11)

(56) References Cited

U.S. PATENT DOCUMENTS

| | | | | |
|---|---|---|---|---|
| 8,918,737 | B2* | 12/2014 | Takahashi | G06F 3/0481 |
| | | | | 715/800 |
| 9,386,275 | B2 | 7/2016 | Oyman | |
| 2008/0092172 | A1* | 4/2008 | Guo | H04N 5/23206 |
| | | | | 725/47 |
| 2009/0316795 | A1* | 12/2009 | Chui | H04N 7/163 |
| | | | | 375/240.25 |
| 2009/0320081 | A1* | 12/2009 | Chui | H04N 7/173 |
| | | | | 725/93 |
| 2015/0015789 | A1* | 1/2015 | Guntur | H04N 5/4401 |
| | | | | 348/581 |
| 2015/0085114 | A1* | 3/2015 | Ptitsyn | H04N 7/183 |
| | | | | 348/143 |
| 2015/0208103 | A1* | 7/2015 | Guntur | H04N 19/46 |
| | | | | 725/61 |
| 2015/0237166 | A1 | 8/2015 | Denoual et al. | |
| 2015/0261939 | A1* | 9/2015 | Arana | G06F 21/10 |
| | | | | 726/26 |
| 2016/0165309 | A1 | 6/2016 | Van et al. | |
| 2016/0275354 | A1* | 9/2016 | Andalo | H04N 19/124 |
| 2017/0251204 | A1* | 8/2017 | Gupte | H04N 13/178 |

OTHER PUBLICATIONS

International Search Report and Written Opinion—PCT/US2017/018101—ISA/EPO—dated May 29, 2017.
Needham C.J., et al., "Tracking Multiple Sports Players Through Occlusion, Congestion and Scale," Proceedings of the British Machine Vision Conference, Jan. 1, 2001, XP002471887, pp. 93-102.
Sanchez Y., eta al., "Compressed Domain Video Processing for Tile Based Panoramic Streaming using SHVC," Immersive Media Experiences, ACM, Oct. 30, 2015, XP058074928, pp. 13-18.
Zhou X., et al., "A Master-Slave System to Acquire Biometric Imagery of Humans at Distance," First ACM SIGMM International Workshop on Video Surveillance, Nov. 2, 2003, XP058214677, pp. 113-120.

* cited by examiner

FIG. 7

METHODS AND SYSTEMS FOR AUTO-ZOOM BASED ADAPTIVE VIDEO STREAMING

CROSS-REFERENCE TO RELATED APPLICATIONS

This application claims the benefit of U.S. Provisional Application No. 62/324,307, filed Apr. 18, 2016, which is hereby incorporated by reference, in its entirety for all purposes.

FIELD

This application is related to video streaming. More specifically, this application relates to performing adaptive video streaming based on auto-zoom.

BACKGROUND

Many devices and systems allow video data to be processed and output for consumption. For example, various electronic devices are in existence that can capture image data and/or video data of a scene and can use the data for different purposes. In one illustrative example, a mobile electronic device can capture video content and can process, transmit, or otherwise use the video content. Various options are available for enhancing digital video content. For example, some video content can be zoomed in and out to provide an enhanced view of the content. Various issues may arise when providing the ability to zoom, such as issues related to bandwidth, quality, among others.

Video content also includes large amounts of data to meet the demands of consumers and video providers. For example, consumers of video data desire video of the utmost quality, with high fidelity, resolutions, frame rates, and the like. As a result, the large amount of video data that is required to meet these demands places a burden on communication networks and devices that process and store the video data.

Various video coding techniques may be used to compress video data. Video coding is performed according to one or more video coding standards. For example, video coding standards include high-efficiency video coding (HEVC), advanced video coding (AVC), moving picture experts group (MPEG) coding, or the like. Video coding generally utilizes prediction methods (e.g., inter-prediction, intra-prediction, or the like) that take advantage of redundancy present in video images or sequences. An important goal of video coding techniques is to compress video data into a form that uses a lower bit rate, while avoiding or minimizing degradations to video quality.

BRIEF SUMMARY

Techniques and systems are described for providing zoom-based adaptive video streaming. For example, a system can support a normal playing mode and an auto-zoom playing mode. In the auto-zoom playing mode, one or more portions of a scene can be zoomed into using an auto-zoom process to provide a zoomed-in view of the scene. For example, a tracking based auto-zoom playing mode can include detecting and tracking an object in a scene. An auto-zoom process can zoom into the scene to show a zoomed view of the tracked object. A client-side feature (e.g., an add-on feature) can be provided that allows the auto-zoom playing mode to be invoked using a user interface, such as by receiving input through a touchscreen, a button, an icon, or any other user interface. The auto-zoom playing mode can also be disabled using a user interface, in which case the streaming system can return to the normal playing mode.

In some implementations, two or more video sources can be used to provide the best quality and bandwidth, complexity trade-off in the auto-zoom playing mode. A video source can include a bitstream, a video track, a video representation, a sub-bitstream, or any other suitable video source. For instance, multiple video streams can be used to perform different parts of the auto-zoom process. In some examples, a first video source can be used by an auto-zoom process to define one or more regions of interest (ROIs) for each frame or sub-sequence of video frames. The first video source can be referred to herein as a tracking quality video source or tracking video source. A second video source, which has a higher video quality (e.g., resolution, frame rate, or other quality metric) than the first video source, can be used to obtain the zoomed-in region from the video for rendering and/or display. The second video source can be referred to herein as target quality video source or target video source. In one illustrative example, the tracking quality video source can be played when the auto-zoom playing mode is not being used, and can continue playing until the auto-zoom playing mode is invoked and the pixels from the target quality video stream are ready for rendering.

In some implementations, a third video source can be used to display video in a normal mode. The third video source can be referred to herein as normal quality video source or normal video source. The normal quality video source can have a video quality that is higher than the tracking quality video source, but a lower video quality than the target quality video source. In one illustrative example, a very low resolution video (e.g., WQVGA or other low quality video) can be used as the tracking quality video source for the auto-zoom process to identify one or more ROIs. The normal quality video source can include, for example, 720p video that can be played as usual when the auto-zoom playing mode is not being used. The normal quality video can continue playing until the auto-zoom playing mode is invoked and the pixels from the target quality video stream (e.g., at 1080p) are ready for rendering.

According to at least one example, a method of processing video data is provided that comprises obtaining a tracking video stream, the tracking video stream having a first resolution. The tracking video stream is used to define one or more regions of interest for one or more frames of the tracking video stream. The method further comprises obtaining a target video stream, the target video stream having a second resolution. The second resolution is a higher resolution than the first resolution. The method comprises processing the target video stream to generate a zoomed-in region of one or more frames of the target video stream. The zoomed-in region corresponds to a region of interest defined using the tracking video stream. The method further comprises providing the zoomed-in region of the one or more frames of the target video stream for display.

In another example, an apparatus is provided that includes a memory configured to store video data and a processor. The processor is configured to and can obtain a tracking video stream, the tracking video stream having a first resolution. The tracking video stream is used to define one or more regions of interest for one or more frames of the tracking video stream. The processor is further configured to and can obtain a target video stream, the target video stream having a second resolution. The second resolution is a higher resolution than the first resolution. The processor is further configured to and can process the target video stream to generate a zoomed-in region of one or more frames of the target video stream. The zoomed-in region corresponds to a region of interest defined using the tracking video stream. The processor is further configured to and can provide the zoomed-in region of the one or more frames of the target video stream for display.

In another example, a computer readable medium is provided having stored thereon instructions that when executed by a processor perform a method that includes: obtaining a tracking video stream, the tracking video stream having a first resolution, wherein the tracking video stream is used to define one or more regions of interest for one or more frames of the tracking video stream; obtaining a target video stream, the target video stream having a second resolution, wherein the second resolution is a higher resolution than the first resolution; processing the target video stream to generate a zoomed-in region of one or more frames of the target video stream, wherein the zoomed-in region corresponds to a region of interest defined using the tracking video stream; and providing the zoomed-in region of the one or more frames of the target video stream for display.

In another example, an apparatus is provided that includes means for obtaining a tracking video stream, the tracking video stream having a first resolution. The tracking video stream is used to define one or more regions of interest for one or more frames of the tracking video stream. The apparatus further comprises means for obtaining a target video stream, the target video stream having a second resolution. The second resolution is a higher resolution than the first resolution. The apparatus further comprises means for processing the target video stream to generate a zoomed-in region of one or more frames of the target video stream. The zoomed-in region corresponds to a region of interest defined using the tracking video stream. The apparatus further comprises means for providing the zoomed-in region of the one or more frames of the target video stream for display.

In some aspects, the method, apparatuses, and computer readable medium described above for processing video data may further comprise: obtaining a normal video stream, the normal video stream having a lower resolution than the second resolution and a higher resolution than the first resolution; and providing the normal video stream for display until a transition to an auto-zoom playing mode is made, wherein the zoomed-in region of the one or more frames of the target video stream is displayed in the auto-zoom playing mode.

In some aspects, the zoomed-in region of the one or more frames of the target video stream is displayed in response to input requesting the transition to the auto-zoom playing mode.

In some aspects, the normal video stream is displayed after the input requesting the transition to the auto-zoom playing mode is received and until pixels of the zoomed-in region of the one or more frames of the target video stream are ready for rendering.

In some aspects, the normal video stream is the same as the tracking video stream having the first resolution.

In some aspects, the normal video stream is processed to generate a zoomed-in region of one or more frames of the normal video stream in response to an input requesting the transition to the auto-zoom playing mode, wherein the zoomed-in region of the normal video stream corresponds to the region of interest defined using the tracking video stream, wherein the zoomed-in region of the one or more frames of the normal video stream is displayed until pixels of the zoomed-in region of the one or more frames of the target video stream are ready for rendering, and wherein the zoomed-in region of the one or more frames of the target video stream is displayed when the pixels of the zoomed-in region of the one or more frames of the target video stream are ready for rendering.

In some aspects, the normal video stream is displayed in response to receiving input requesting a transition from the auto-zoom playing mode to the normal mode.

In some aspects, resolutions of the normal video stream, the target video stream, and the tracking video stream are dynamically adjustable based on bandwidth of one or more channels over which the normal video stream, the target video stream, and the tracking video stream are received.

In some aspects, the tracking video stream has a first frame rate and the target video stream has a second frame rate, wherein the second frame rate is a higher frame rate than the first frame rate.

In some aspects, the target video stream includes one or more frames coded using tile-based video coding, the one or more frames being divided into a plurality of tiles. In some examples, the method, apparatuses, and computer readable medium described above for processing video data may further comprise: identifying at least one tile in a frame of the target video stream, the at least one tile corresponding to the zoomed-in region of the target video stream, wherein the at least one tile is identified using information related to the region of interest defined using the tracking video stream. For example, the information related to the region of interest includes bounding box information and information describing how the bounding box maps to the frame. In some aspects, each tile of the plurality of tiles is arranged in a separate track.

In some aspects, a zoomed-in region of a first frame is mapped to a first plurality of tiles of the first frame, the first plurality of tiles being different than a second plurality of tiles of a second frame, and wherein the first plurality of tiles of the first frame and the second plurality of tiles of the second frame are not co-located.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present invention are described in detail below with reference to the following drawing figures:

FIG. 7 is a block diagram illustrating an example of a frame with tiles, in accordance with some examples.

DETAILED DESCRIPTION

Figure 1:
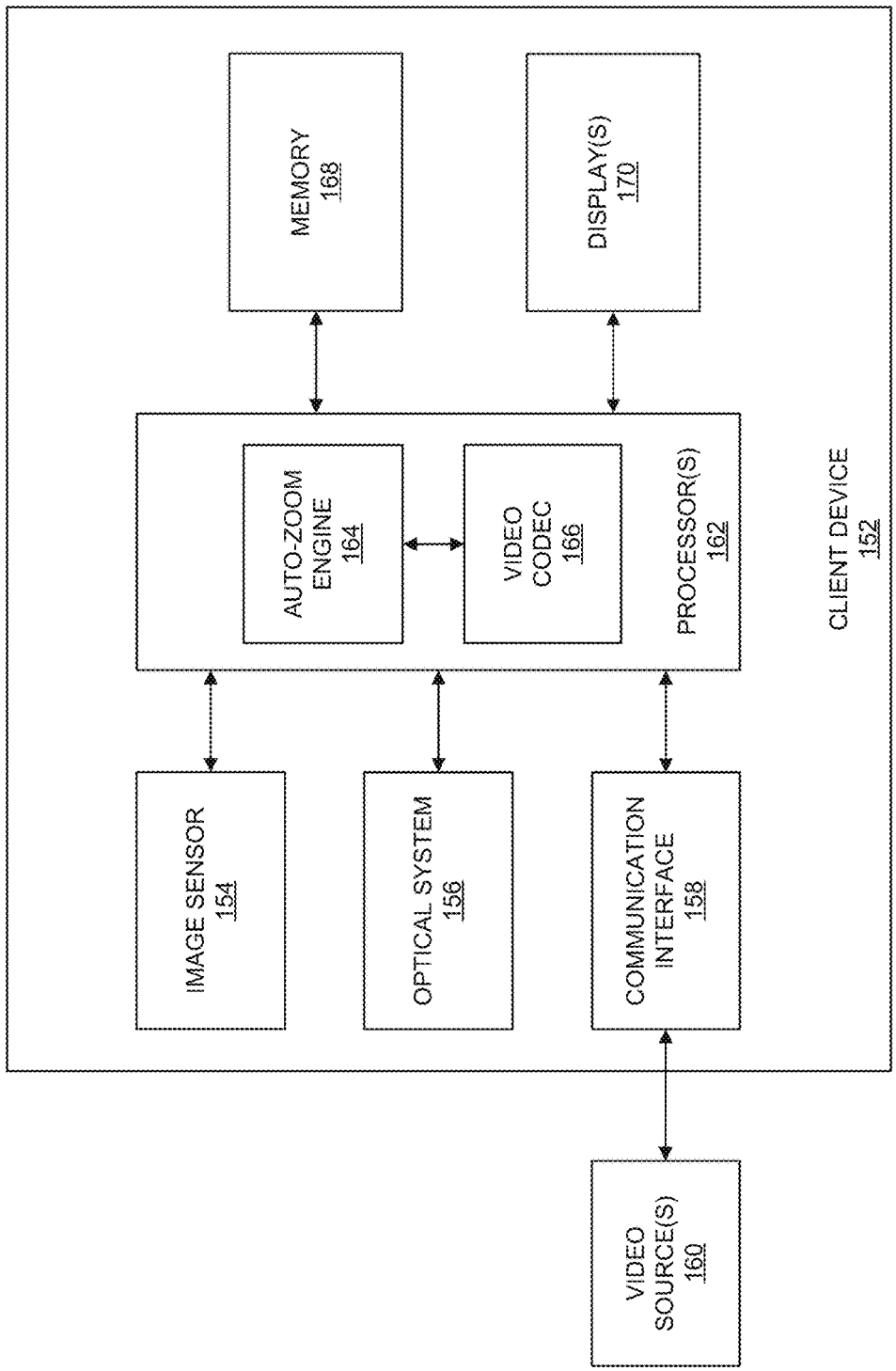
FIG. 1 is a block diagram illustrating an example of a device for performing auto-zoom based techniques, in accordance with some examples.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the invention. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable medium. A processor(s) may perform the necessary tasks.

Several systems and methods of video processing are described herein. In some examples, one or more systems and methods of processing video data are described for providing an automatic-zoom (auto-zoom) process for adaptive video streaming or other video sources. Traditionally, auto-zoom is a recording-side feature in which a video encoder or other source device provides the video stream that already has taken the auto-zoom effect into consideration. For example, a video source can identify zoomed-in portions of video data and can provide or indicate the zoomed-in portions to a client-side device for rendering and/or display. The systems and methods described herein provide an auto-zoom feature that can be implemented as an optional client-side feature. In some cases, the auto-zoom feature can be more closely incorporated with existing video streaming services, such as Youtube, Netflix, Hulu, or any other video streaming service. While some examples are described herein in relation to video streaming, one of skill will appreciate that the techniques can apply to other video sources other than streaming services.

In some embodiments, the auto-zoom systems and methods allow a streaming service (or other video service) to support a normal playing mode and at least one additional mode, including an auto-zoom playing mode. When the auto-zoom playing mode is invoked, the auto-zoom based streaming system is used to provide a different user experience than the normal playing mode. The additional auto-zoom playing mode can also be disabled anytime so the system can revert back to the normal playing mode. The auto-zoom mode can include at least two video sources or streams (e.g., including bitstreams, tracks, video representations, video sub-bitstreams, or other suitable video source) being provided to a client-side device to provide the best quality and bandwidth and complexity trade-off. The client-side device can include a playback device, a component of a playback device (e.g., a receiver, a decoder, or other video-processing component), or other suitable device. Further details of the auto-zoom based adaptive video streaming systems and methods are described below.

Some techniques for customizing a display region include pinch and zoom functions. For example, these functions may be default in smartphone camera applications. A zoom function (e.g., in response to a pinch input) may enlarge a region of interest of a scene captured in one or more images, allowing users to view the enlarged scene, record a video clip of the enlarged scene, or other utilize the zoomed view. A zooming effect of such a pinch and zoom function may include zooming to the center area of a video frame. A problem occurs when the object of interest is not located in the center, in which case the zooming effect may either not reach the best zooming level or may be eliminated in the scene. Such a pinch and zoom function may also require extensive user input to zoom in and out for photo and/or video capture. Further, a field of view (FOV) of the camera view is the same as the zooming region, making it difficult for a user to capture a moving object of interest by zooming in and out to find the object of interest.

A Picture in Picture (PiP) feature may also be used to provide a zoom-in effect. For example, commercial devices may include a PiP camera feature that includes a small viewing region (e.g., a rectangle viewing region), in addition to or displayed over the larger view of the scene, that shows a zoom-in effect of a selected area. The zoomed-in area may not be restricted to the center of the frame. Such a PiP feature can zoom into areas that include nearly the whole FOV. In the PiP approach, the zoomed object may typically appear in the center of the PiP viewing region. Shake and jitter due to the camera movement and/or tracking may be enlarged and can cause degraded visual effects.

Tracking and zooming can also be accomplished using one or more wireless sensors. A sensor-based tracking and zooming algorithm may acquire only the location, but not the size information. Further, the zoom may only be center-based (e.g., due to limitations of the camera). One example of an application of sensor-based tracking and zooming systems can include control of a motorized professional camera to pan and zoom.

In some examples, a tracking-based automatic-zoom (auto-zoom) method can be provided. For example, automatic video zooming can be provided for certain broadcast content (e.g., sporting events, such as a soccer game), provided to devices, such as smart phones, tablets, or other devices. Using automatic zoom, a zooming effect is based on a detected or tracked object (e.g., a soccer ball). A zooming ratio can be based upon movement of the object. In some cases, automatic zoom can cause the object to be taken out of the zoomed view.

In some implementations, the tracking-based auto-zoom method includes a region of interest (ROI) driven zooming effect, in which case the zooming effect is automatically and smoothly changed according to the movement, location, and the size of a tracked object. The tracking module covers the whole field of view (FOV) of the image sensor or camera. The entire FOV can thus be considered in determining a zoom region. In other words, zoom region control may be based on an entire camera FOV and may not be limited to the view within the zoom region itself. The position of the zoomed object may not always be in the center of the zoomed view, but can be within a range from the center so that the zoomed view is more natural and stable. The tracking-based auto-zoom method also includes minimum user input. For example, the tracker can only require one-touch input to select the object of interest, and then can automatically follow the object of interest during preview or video capture.

Tracking-based auto-zoom also provides full FOV processing and display. The tracker can still run on the original camera FOV, and not just on the cropped/zoomed field of view. The objects of interest can thus move in the wide angle FOV, which is the same FOV of the camera sensor. A user can view and/or capture the zoomed region on the device, which has an enlarged and more focused FOV. Advanced stabilization modules are also provided. For example, by taking advantage of global motion estimation, a set of stabilization methods can be applied to reduce jitters caused by users, allowing a more stabilized result to be generated. Smooth zooming ratio transition is also provided. For example, a zooming ratio is related to the size of objects and is stabilized upon scaling history, resulting in a smooth zooming ratio transition and good visual effect. A clear advantage from the user experience perspective of the tracking-based auto-zoom method is that it provides a stable video output and thus can be used for existing commercial video applications.

FIG. 1 is a block diagram illustrating an example of a client device 152 that can perform one or more of the methods described herein. For instance, the client device 152 may be configured to perform the auto-zoom techniques described herein to automatically zoom in to and/or zoom out of one or more frames of video. The client device 152 can include any suitable electronic device, such as a camera (e.g., a personal camera, a production-level camera, an action camera, a surveillance camera (e.g., an IP camera), a mounted camera, or other suitable camera), a video camcorder, a digital camera, a mobile phone, a smart phone, a computer (e.g., desktop computer, laptop computer, or the like), a tablet device, a media player, a television, a vehicle or device within a vehicle, a wearable device, a virtual reality device (e.g., a head mounted display or headset), an augmented reality device (e.g., a head mounted display or headset), a mixed reality device, a robot, an aircraft, a drone or unmanned aerial vehicle (UAV), a smart application, healthcare equipment, a gaming console, a personal digital assistant (PDA), a set-top boxe (STB), a smart appliance, or any other suitable device that can display content or provide content for display. The client device 152 may include one or more components or elements. One or more of the components or elements may be implemented in hardware (e.g., circuitry) or a combination of hardware and software (e.g., a processor with instructions).

In some configurations, the client device 152 may include a processor 162, a memory 168, a display 170, an image sensor 154, an optical system 156, a communication interface 158, or multiple of each of these components (e.g., multiple processors, multiple image sensors, multiple memory chips, multiple displays, multiple communication interfaces, such as multiple transceiver radios, or the like). The processor 162 may be coupled to (e.g., in electronic communication with) the memory 168, the display 170, the image sensor 154, the optical system 156, and/or the communication interface 158. The processor 162 may be a general-purpose single- or multi-chip microprocessor (e.g., an ARM), a special-purpose microprocessor (e.g., a digital signal processor (DSP)), a microcontroller, a programmable gate array, or any other suitable processing device. The processor 162 may be referred to as a central processing unit (CPU). Although just a single processor 162 is shown in the client device 152, a combination of processors (e.g., an ISP and an application processor, an ARM and a DSP, or any other suitable combination) could be used. The processor 162 may be configured to implement one or more of the methods disclosed herein.

The client device 152 can communicate with one or more other electronic devices or systems using the communication interface 158. In some examples, the communication interface 158 may provide an interface for wired and/or wireless communications. For example, the communication interface 158 may be coupled to one or more antennas for transmitting and/or receiving radio frequency (RF) signals. In some examples, the communication interface 158 can include one or multiple wireless transceivers. Additionally or alternatively, the communication interface 158 may enable one or more kinds of wireline communication (e.g., Universal Serial Bus (USB), Ethernet, fiberoptics, or other suitable wireline communication).

In some configurations, the client device 152 may include and/or utilize multiple communication interfaces 158. For example, one communication interface may be a cellular interface (e.g., 3G, Long Term Evolution (LTE), CDMA, or the like), another communication interface may be an Ethernet interface, another communication interface may be a universal serial bus (USB) interface, another communication interface may be a wireless local area network (WLAN) interface (e.g., Institute of Electrical and Electronics Engineers (IEEE) 802.11 interface), and another communication interface may be a short-range communications interface (e.g., Bluetooth, Zigbee, or the like). In some configurations, the communication interface 158 can send information (e.g., image information, one or more video files, surround view information, audio information, or other suitable information) to and/or receive information from another device (e.g., video source server, such as a streaming server, a display, a vehicle, a smart phone, a camera, a display, or other suitable device).

The client device 152 may obtain or receive one or more frames (also referred to as images). In some examples, the image sensor 154 and the optical system 156 (e.g., one or more lenses, etc.) can be used to capture images or frames of a scene. For example, the image sensor 154 can capture one or more frames of the scene. The frames can include information depicting images of the scene. The optical system 156 can focus images of portions of the scene (e.g., including one or more objects) that are located within the field of view of the optical system 156 onto the image sensor 154. In some examples, the client device 152 is a camera and/or can include one or more cameras. A camera can include at least one image sensor and at least one optical system. The image sensor 154 and/or optical system 156 may be coupled to and/or controlled by the processor 162.

In some examples, the client device 152 may request and/or receive the one or more frames from one or more video sources 160. For example, the video source(s) 160 can include one or more network servers (e.g., video streaming server, a video broadcast server, or the like), one or more external cameras coupled to the client device 152, one or more external storage devices or libraries, or any other source of video content. In some configurations, the client device 152 can request and/or receive the one or more frames from the one or more video sources 160 using the communication interface 158. In some cases, the client device 152 may include one or more cameras (e.g., including the image sensor 154 and the optical system 156) and may also receive images from one or more external video sources 160.

In some configurations, the client device 152 may include a camera software application and/or one or more displays 170. When the camera application is running, images of the scene including objects that are located within the field of view of the optical system 156 may be captured by the image sensor 154. Image frames that are captured by the image sensor 154 and/or image frames received from the one or more video sources 160 can be presented on the display 170. For example, one or more image frames may be sent to the display 170 for viewing by a user. In some configurations, these images may be played back from the memory 168, which may include previously captured image frames. Image frames obtained or captured by the client device 152 can be video frames or still images. In some configurations, the display 170 can present a full field of view (FOV) of the image sensor 154 and/or can display one or more zoom regions (also referred to as regions of interest (ROIs)).

The processor 162 can include and/or implement an auto-zoom engine 164. One or more image frames and/or information associated with the one or more image frames can be provided to the auto-zoom engine 164. For example, the auto-zoom engine 164 can request and/or obtain image frames from the image sensor 154 and/or from an external source, such as video source(s) 160 (e.g., a network server, a streaming server, an image or video storage device, an external camera, or the like) through the communication interface 158. The image frames can be processed by the auto-zoom engine 164 to perform auto-zoom.

The auto-zoom engine 164 may include and/or implement an object tracker (not shown). One or more of the image frames may be provided to the object tracker, and the object tracker can track one or more objects in one or more image frames. For example, the object tracker can obtain object tracking information based on tracking the one or more objects. Object tracking information can include location information and/or size information corresponding to a tracking region that can include one or more tracked objects. In some examples, a tracking region includes a region surrounding an object of interest, and a zoom region refers to a region in an image frame that will be zoomed into (e.g., magnified). In such examples, a zoom region can also be referred to as a region of interest (ROI). In some examples, a tracking region and/or a zoom region can include or be represented using a bounding region or a bounding box. Based on the tracking information, a zoom controller (not shown) of the auto-zoom engine 164 can determine a zooming level and a location of a zoom region in which to zoom. Some examples of the object tracker 116 may implement optical flow.

In some configurations, the object tracker can implement a touch to track technique. For example, the client device can include a user interface (not shown) that can receive an input that indicates an object of interest (e.g., touch input, mouse click, a gesture, or other suitable input). Information related to the selected object can be provided to the object tracker. The object tracker may determine the location and/or size of a tracking region that includes the object of interest. Using such a technique, the object tracker can provide the location and the size of the tracking region based on relatively little user input (e.g., one touch) in some configurations.

In some configurations, the object tracker can perform object tracking based on one or more tracking regions in a current frame. For example, the object tracker can track a tracking region including image content (e.g., a tracked object) from frame-to-frame. The object tracking may provide an estimated location of the tracking region in a subsequent frame that follows the current frame in time. In some configurations, the object tracker can perform motion-based object tracking. For example, the object tracker can determine motion of an object between frames (e.g., a motion vector(s) corresponding to an object's motion between frames) in order to identify one or more tracking regions in subsequent frames.

The object tracker may determine a tracking region of a subsequent frame based on the object tracking. For example, the object tracker may generate a tracking region of the subsequent frame that corresponds to the tracked image content (e.g., according to the motion vector(s) corresponding to the tracked object). In some configurations, the object tracker can detect and/or use one or more features (e.g., feature vectors, feature codes, or other feature representation) extracted from the current frame tracking region to determine a corresponding subsequent frame tracking region. For example, the object tracker can extract one or more features based on a tracking region being tracked (e.g., a detected tracking region, a tracking region corresponding to a user input, or the like).

The auto-zoom engine 164 can also include and/or implement a global motion estimator (not shown). For example, the global motion estimator can perform global motion estimation to estimate the motion of the camera capturing the image frames being processed for auto-zoom. The global motion estimator can estimate global motion between frames. Global motion can include the motion of content between frames. Global motion information can include an indicator of and/or an estimate of the global motion. In some examples, the global motion estimator can determine global motion information by computing one or more motion vectors between frames (e.g., using optical flow or other suitable technique). For instance, one or more global motion vectors can span a large portion of the frame. In some cases, global motion vectors may cover a particular proportion of a frame. For example, the global motion vectors may span and/or consider 90% of the image (and may ignore borders, for instance). In some examples, global motion vectors may be determined in a grid pattern over the image. The global motion may be determined based only on the input images in some approaches (without other input motion information, such as motion information from motion sensors like accelerometers and/or gyroscopes, for example).

In some configurations, the global motion estimator may additionally or alternatively estimate global motion based on motion sensor data other than only image data. For instance, the client device 152 may include one or more accelerometers, gyroscopes, and/or other motion sensors. The motion data sensed by the motion sensor(s) may be provided to the global motion estimator, and the global motion estimator can determine global motion information (e.g., a global motion estimate) based on the motion data. In some cases, global motion information may be determined independently of mechanical control, such as a mechanical control signal that controls mechanical operations of the client device 152. An example of a mechanical control signal includes a signal that controls mechanical actuators for moving a camera (e.g., pan and tilt). For instance, estimating global motion may not be deterministic, where a motion control signal is known.

The auto-zoom engine 164 may include and/or implement a zoom controller (not shown). The zoom controller can control the auto-zoom operations. For example, the zoom controller can control the location, the motion, the motion response speed, the size, and/or the zoom level of a zoom region (e.g., a ROI for zooming). The zoom region may be a region within the full FOV of the image sensor 154 and/or the FOV of an external camera providing images to the client device 152. For example, a ROI may be a subregion of the full FOV and may be relative to the full field of view. The image content within the zoom region may be magnified (e.g., digitally scaled and/or enhanced, etc.) in order to enlarge the image content. In some configurations, auto-zoom can be performed based on global motion information and/or object tracking information. The zoom controller can perform auto-zoom in accordance with one or more functions, procedures, and/or approaches described in connection with the techniques described herein.

The auto-zoom engine 164 can track an object of interest while stabilizing overall scene movement. For instance, a zoom region may be determined based on the foreground (tracked object) and/or global motion (e.g., camera motion). In one example, a zoom region can be defined over consecutive frames to surround a tracked object (in a tracking region) as it moves to different locations across the frames. When the size of the tracking region changes, the zoomed view may be updated smoothly such that the object of interest appears with a reasonable ratio in the zoom region. In some cases, the tracked object can become missing in the frame or the tracker has lost tracking, the auto-zoom engine 164 can smoothly return back to the original FOV (e.g., the full FOV of an image).

In some examples, full FOV processing and/or display may be implemented. For example, the auto-zoom engine 164 may perform object tracking on the original camera FOV (e.g., the entire image captured by a camera without narrowing the field of view). In such examples, an object of interest may move in a wide angle FOV (which may be the same as that of the camera), while the zoom region (which has an enlarged and more focused FOV) may be presented and/or captured on the device. In one illustrative example, the zoom region may include a subset of the full camera FOV. Even when the zoom region is a subset of the full FOV, the tracking may be performed based on the full FOV. For example, the auto-zoom engine 164, when performing object tracking, can consider, process, and/or take into account the full image corresponding to the full FOV of the camera. In some cases, the zoom ROI motion and/or motion response speed may be relative to the full FOV. In some approaches, the zoom ROI and the full FOV may be provided from the same image sensor (e.g., from the same camera).

In some configurations, a smooth zooming ratio transition can be provided. The zooming ratio can be related to the size of an object being tracked and/or can be stabilized based on scaling history, which may result in a smooth zooming ratio transition and a good visual effect. In some cases, the amount of zoom (e.g., zoom factor, magnification, etc.) may be based on a tracking region size and a zoom region size. For example, the zoom level may be based on a size ratio of the tracking region and the zoom region. For instance, the zoom controller of the auto-zoom engine 164 may increase the zoom when the size ratio is less than a minimum zoom threshold. Additionally or alternatively, the zoom controller may decrease the zoom when the size ratio is greater than a maximum zoom threshold. The maximum zoom threshold and the minimum zoom threshold may be the same or may be different. For example, there may be a range between the minimum zoom threshold and the maximum zoom threshold.

In some implementations, the zoom controller may determine a zoom region motion based on global motion information. For example, the motion of the zoom region between frames or the location of the zoom region (e.g., in a current frame) may be determined based on the global motion (e.g., between a previous frame and the current frame). In some examples, the zoom region motion (e.g., the zoom region location in the current frame) may be based on the current frame global motion (e.g., the global motion from a previous frame to the current frame). Global motion of one or more previous frames (e.g., global motion between a previous frame and a frame before the previous frame, global motion between earlier previous frames, etc.) may be utilized to determine zoom region motion in some approaches. In some approaches, the zoom controller may determine the zoom region motion based on a sum of a global motion and a difference between a current frame zoom region anchor point and a previous frame zoom region anchor point. Additionally or alternatively, the zoom controller may determine the zoom region motion based on a global motion, a difference between a current frame zoom region anchor point and a previous frame zoom region anchor point, a previous frame global motion, and a difference between a previous frame zoom region anchor point and an earlier frame zoom region anchor point. The zoom controller may utilize global motion information (e.g., global motion) to determine the zoom region motion in accordance with zoom region motion speed and/or zoom region acceleration. In some configurations, the zoom region motion may not drive mechanical pan, tilt, and/or zoom (e.g., motors, actuators, etc., for pan, tilt, and/or zoom).

In some examples, the zoom controller can determine a zoom region (e.g., a zoom ROI) motion response speed based on a location of a tracked object within a zoom region. For example, the zoom controller can control the horizontal and/or vertical translation of the zoom region (e.g., within the field of view). In some approaches, the region motion response speed may vary based on the location of the tracked object (e.g., tracking region) within the zoom region. For example, the zoom controller may adjust the zoom region motion response speed (e.g., translation response speed) depending on the proximity between the tracked object (e.g., tracking region) and the border of the zoom region. In some configurations, the zoom region motion response speed may be slower near the center of the zoom region and may be faster near the edge of the zoom region. In this way, the zoom region may follow the motion of the tracked object (e.g., tracking region) slowly near the center of the zoom region. This may allow for smooth and slow motion while the object is near the center of the zoom region. The zoom region may follow the motion of the tracked object (e.g., tracking region) quickly as the object nears the edge of the zoom region. This approach may help to ensure that the zoom region can quickly follow the tracked object as the object nears the border of the tracking region.

The processor 162 may provide the zoom information (e.g., the zoom region, including zoomed region information, a cropped zoom region, or the like). For example, the processor 152 may provide the zoom ROI to the display 170 so that the ROI can be presented as a zoomed region of the full FOV. In some examples, the processor 162 can send (e.g., using the communication interface 158) information defining the zoom ROI to another device, such as video source(s) 160 (e.g., a network server, a streaming server, an image or video storage device, an external camera, or the like). The ROI making up the zoom region may occupy only a portion of a view of the display in some approaches. For example, the zoom region may be presented on top of the full field of view (e.g., picture-in-picture (PiP), picture and picture, or the like). In other approaches, the zoom region may occupy the entire view. For example, the full FOV may not be shown when the zoom ROI is displayed.

In some examples, the auto-zoom engine 164 can perform digital zoom. For example, the auto-zoom may not include changing optical zoom (e.g., focal length) in some cases. In such examples, the full FOV size and/or the focal length of the optical system 156 may be static (although, in some cases, the viewpoint, camera motion, and/or scene may change from frame-to-frame). For instance, performing automatic zoom may be accomplished separately and/or independently from optical zoom (e.g., may not utilize focal length) in some approaches. It should be noted that performing automatic zoom may be performed in conjunction with optical zoom in some configurations.

The memory 168 can store instructions and/or data. Examples of instructions and/or data that may be stored by the memory 168 can include image data (e.g., zoom ROI data), zoom controller instructions, object tracker instructions, global motion estimator instructions, among other instructions. The memory 168 can be any electronic component capable of storing electronic information. The memory 168 can be embodied as random access memory (RAM), read-only memory (ROM), magnetic disk storage media, optical storage media, flash memory devices in RAM, on-board memory included with the processor, EPROM memory, EEPROM memory, registers, and so forth, including combinations thereof. The processor 162 can access (e.g., read from and/or write to) the memory 168. The instructions and/or data stored by the memory 168 are executable by the processor 162 to implement one or more of the methods or processes described herein. Executing the instructions can involve the use of the data that is stored in the memory 168. When the processor 162 executes the instructions, various portions of the instructions (e.g., data) may be loaded onto and executed by the processor 162.

In some configurations, the client device 152 may present a user interface on the display 170. For example, the user interface can enable a user to interact with the client device 152 using one or more inputs. In various examples, the user interface may receive a touch, a mouse click, a gesture and/or some other input. In some configurations, the user interface can enable a user to select an option to invoke the auto-zoom feature, to select an object (for tracking and/or zooming), to indicate preferences for zooming behavior, and to perform any other suitable actions related or unrelated to the auto-zoom functionality.

The display 170 may be integrated into the client device 152 and/or may be coupled to the client device 152. For example, the client device 152 may be a smartphone with an integrated display. In another example, the client device 152 may be coupled to one or more remote displays and/or to one or more remote devices that include one or more displays.

In one illustrative example of performing an auto-zoom process, input images (e.g., input frames) may be provided to the auto-zoom engine 164. The global motion estimator of the auto-zoom engine 164 can estimate the motion of the camera and/or the image content. For example, the global motion estimator may compute the inter-image (e.g., inter-frame) camera motion. The resulting global motion information may reflect the camera movement in the real world, which may be utilized to improve zooming location calculation and/or scene stability as described above.

The object tracker of the auto-zoom engine 164 can compute the object motion in the input image frames and the object size in the input image frames. In some examples, the object tracker can implement a touch to track technique. For example, with a minimal user input (e.g., one touch), the object tracker may determine the location and/or size of a tracking region (e.g., bounding region, bounding box, or other representation of a tracked object) that includes the object of interest. Based on the tracking information, the zoom controller (e.g., automatic zoom) may determine a zooming level and/or a location of a zoom region.

The zoom controller may leverage the global motion information (e.g., information of camera motion) and object tracking information (e.g., target object motion information) to compute the location and/or size of the zoom region (e.g., cropped frame) under the smoothness constraints on the cropped video. The zoom controller may implement one or more of the aspects of the improved zooming strategy described above. For example, the zoom controller may control the zoom region in order to follow an object of interest and/or stabilize overall scene movement. Additionally or alternatively, the zoom controller can smoothly update the FOV when the size of the tracking region changes (to keep the object of interest at a reasonable size ratio to the zoom region). Additionally or alternatively, the zoom controller may smoothly return to the original field of view when the tracked object is missing in an image (e.g., frame) and/or when tracking is lost. The zoom controller can produce cropped images (e.g., cropped frames). For example, the zoom controller may crop and/or scale (and/or control another component to crop and/or scale) the input images according to the zoom region. For instance, the zoom controller may crop and/or discard any image content that is outside of the zoom region. In some configurations, the zoom controller may scale the cropped images to a particular size (e.g., the size of a display, the size of a window on a display, etc.). For example, an upscaling process may be performed to upscale the cropped images to the size of a display or a window on the display.

Figure 2:
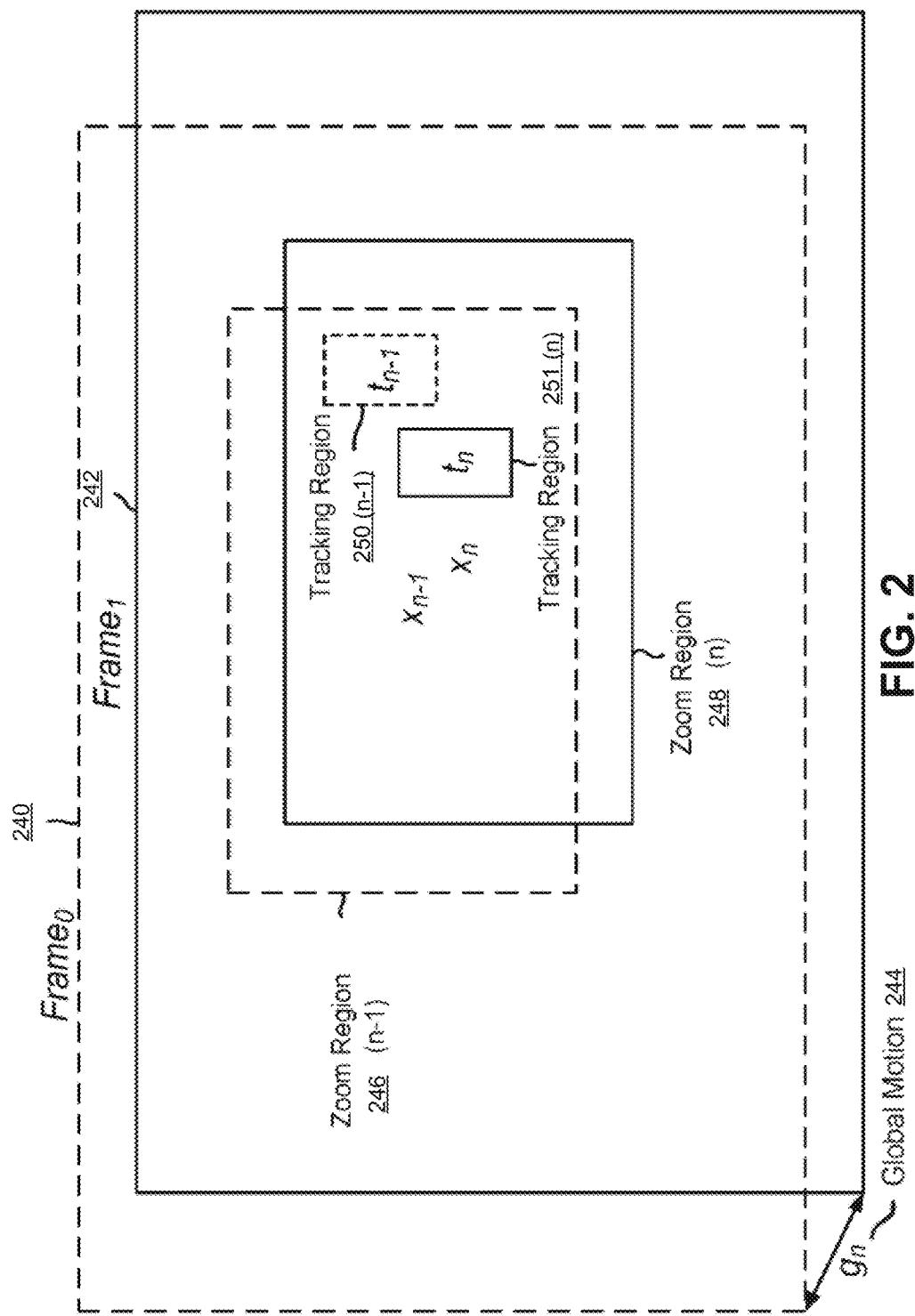
FIG. 2 is a diagram illustrating an example of zoom regions in image frames, in accordance with some examples.

FIG. 2 is a diagram illustrating an example of zoom regions in image frames (e.g., a ROI in which zoom will occur) resulting from performance of an auto-zoom process. A previous frame 240 (e.g., Frame$_0$) and a current frame 242 (e.g., Frame$_1$) are shown. The previous frame 240 is captured prior in time than the current frame 242. For example, the previous frame 240 may be the frame that is captured immediately before the current frame 242A, in which case the previous frame 240 and the current frame 242A are consecutive frames. In another example, the previous frame 240 and the current frame 242A are not consecutive frames, but instead have one or more frames between them. As shown in FIG. 2, global motion gn 244 occurs between the previous frame 240 and the current frame 242. For example, the global motion 244 may be due to movement of the camera (e.g., from movement of a studio camera capturing scenes for a film, from hand movement of a user carrying a smartphone, or other camera movement). A previous frame zoom region 246 and a current frame zoom region 248 are also shown within the fields of view of the previous frame 240 and the current frame 242, respectively. The current frame zoom region 248 is an updated zoom region relative to the previous frame zoom region 246. The previous frame zoom region 246 includes a previous frame tracking region 250, and the current frame zoom region 248 includes a current frame tracking region 251. The previous frame tracking region 250 and the current frame tracking region 251 can include a bounding box, or the like, surrounding an object being tracked in the previous frame 240 and the current frame 242.

Figure 4:
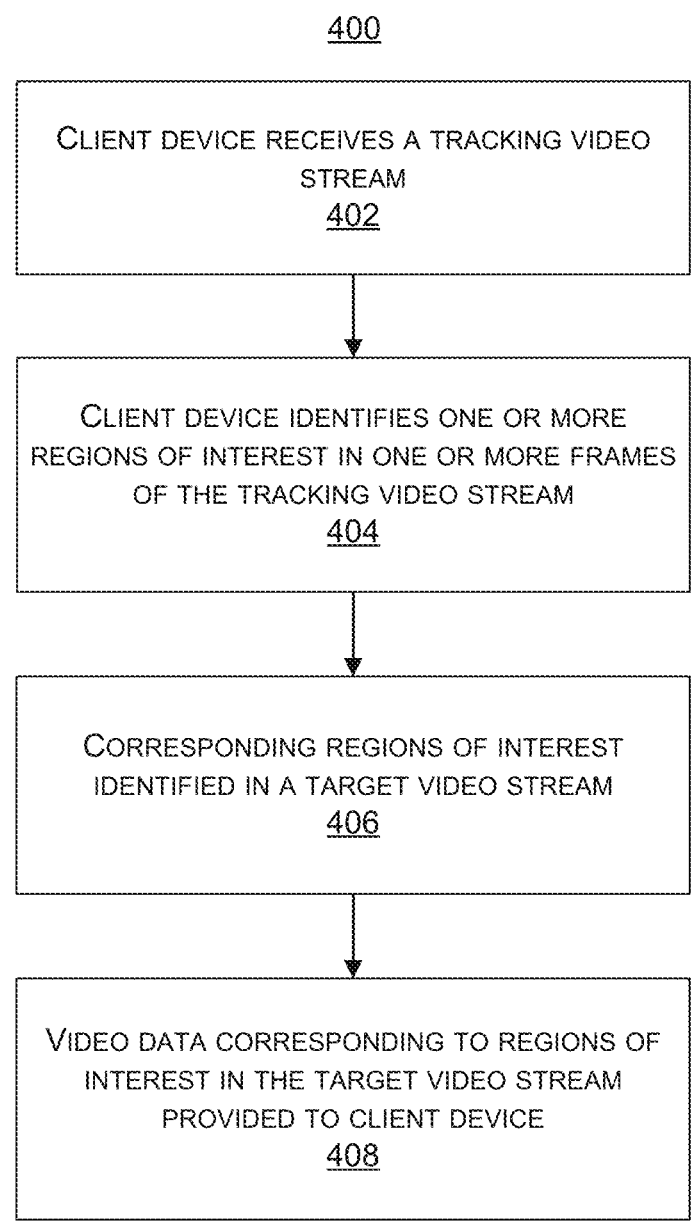
FIG. 4 is a flow diagram illustrating an example of a process of performing automatic zoom using multiple video sources, in accordance with some examples.

In FIG. 4, $x_i$ is a zoom region anchor point location of a zoom region (e.g., the center or other point of the zoom region), and $t_i$ is a tracking region anchor point location of a tracking region (e.g., the center or other point of the tracking region). An unknown parameter is $x_n$ (e.g., the anchor point for the zoom region 248 for the current frame 242). The term i is a frame index and the term n refers to a frame number, with n referring to a current frame and n−1 referring to a previous frame. Using such terminology, the term $x_n$ is the zoom region anchor point location (the unkown) of the zoom region 248 for the current frame 242, the term $x_{n-1}$ is the zoom region anchor point location of the zoom region 246 for the previous frame 240, the term $t_n$ is the tracking region anchor point location of the tracking region 251 for the current frame 242, and the term $t_{n-1}$ is the tracking region anchor point location of the tracking region 250 for the previous frame 240. It should be noted that any point (e.g., anchor point) in the zoom region may be utilized as a reference for measuring distance. A center point or location may be one example of an anchor point. Additionally or alternatively, $t_i$ may be a point in a tracking region other than the center of the tracking region, in some cases. In order to capture the tracked object in the zoom region, a term v(x) may be formulated, which defines the distance of the tracking center and the anchor point of the zoom region and its rate of change. In some configurations, v(x) may be expressed as given in Equation (1):

$$v(x_n) = a_0(t_n - x_n)^2 + a_1[(t_n - x_n) - (t_{n-1} - x_{n-1})]^2 \qquad (1)$$

In order to make the zoomed region steady, it may be beneficial to formulate h(x), which describes the motion speed and acceleration of the zoom region. In some examples, h(x) may be expressed as given in Equation (2) below. It should be noted that the global motion $g_n$ may be expressed in terms of one or more dimensions (e.g., horizontal and vertical motion).

$$h(x_n) = b_0[g_n + (x_n - x_{n-1})]^2 + b_1[g_n + (b_n - x_{n-1}) - g_{n-1} - (x_{n-1} - x_{n-2})]^2 \qquad (2)$$

The zoom region may have an anchor point $x_n$ that minimizes the function $f$. In some examples, $f$ may be expressed as given in Equation (3):

$$f(x) = v(x) + h(x) \qquad (3)$$

The four coefficients $a_0$, $a_1$, $b_0$, and $b_1$ may control how the zoom region behaves. For example, the coefficients may be selected to trade a fast response (e.g., response speed) to object motion with a high inertial state to keep the zoom region more static. In some configurations, $a_1 + a_1 + b_0 + b_1 = 1$. Larger a values for the coefficients may increase the zoom region motion response speed (and may increase jitter, for example), whereas larger b values for the coefficients may decrease the zoom region motion response speed (e.g., increase smoothness). In some approaches, the client device 152 may determine a response speed (e.g., may select coefficients) depending on where the object is inside the zoom region (e.g., cropped box). The zoom region motion response speed may refer to the translation (e.g., vertical and/or horizontal movement, x-y movement, etc.) of the zoom region relative to the tracking region. For example, a high zoom region motion response speed will closely follow the tracking region, whereas a low zoom region motion response speed will lag behind the tracking region (but will exhibit smooth motion, for instance). Different behavior may be beneficial depending on where the object is within the zoom region.

The auto-zoom technology described above may be used with various types of video services. Different video services or sources can be used to provide video content to a receiving device, such as client device 152 or other receiving device. In some examples, high quality video delivery can be implemented through broadcasting, in which case a service provider may have a very strict control of how the video content will be presented. The video content can be delivered using broadcasting with a relatively high bandwidth and with a stable channel.

Other video services include streaming services (e.g., YouTube, Netflix, Hulu, or other suitable video streaming service). Streaming video services are becoming more and more popular, and are in some cases replacing the traditional broadcasting services. Original streaming services were to adapt to heterogeneous devices and bandwidth conditions. However, with the rapid growth of the client computational and rendering capabilities in the recent years, video streaming systems in many cases may adapt only to the network conditions. In some cases, the network condition adaptation process may be client driven. For example, a client device can select one video representation according to its bandwidth capability or preference, and can begin receiving the video segments of the selected, negotiated, and/or adapted video representation.

Figure 3:
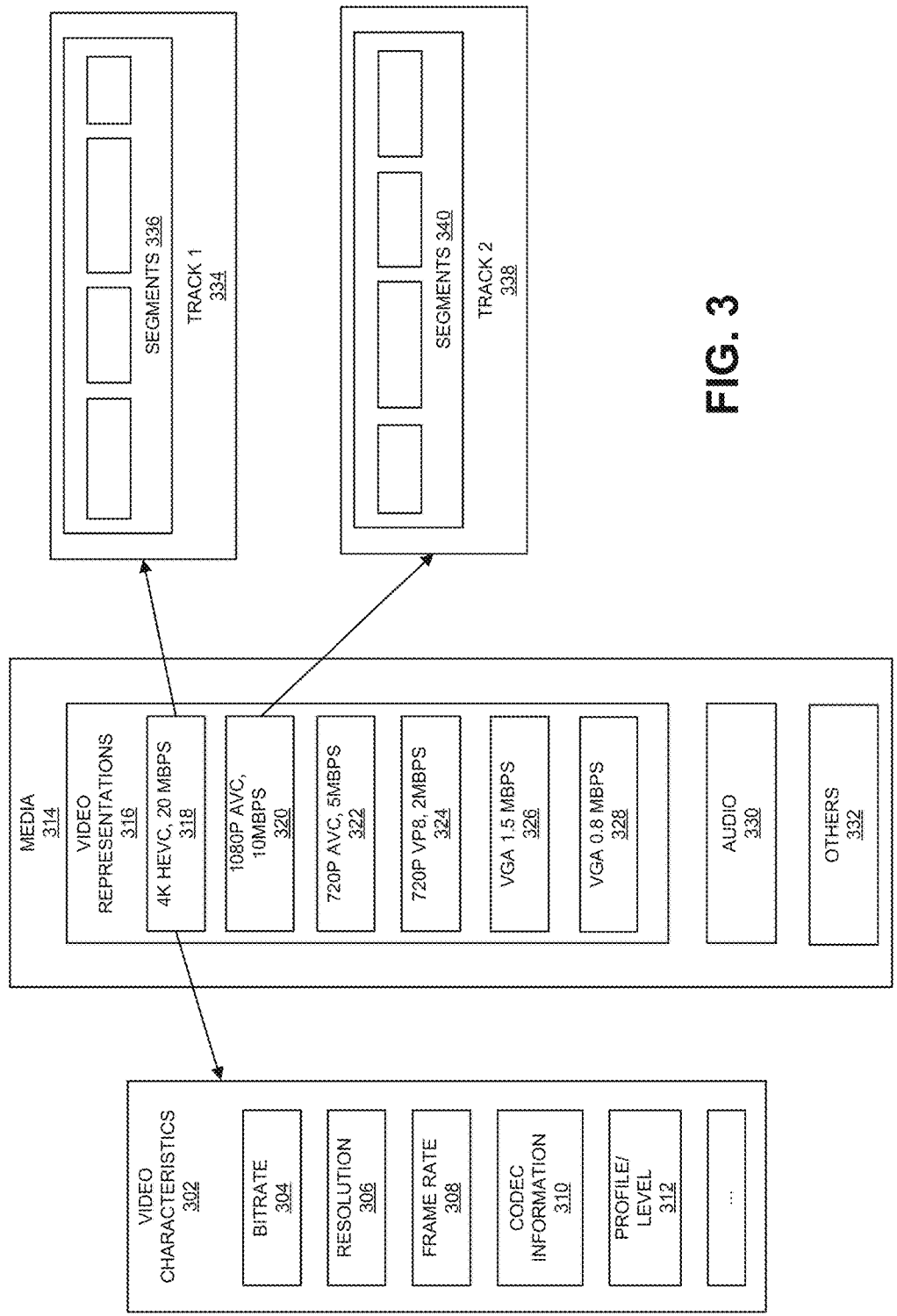
FIG. 3 is a block diagram illustrating an example of a video streaming model for a media item, in accordance with some examples.

FIG. 3 shows an example of a video streaming model for an item of media 314. The media 314 can be a movie, a television show, or any other suitable item of media content. Various video representations 316 of the media 314 can be available for streaming by one or more streaming servers, and can also be referred to as video bitstreams. The video representations 316 can include different versions of the media 314, each representation having different video characteristics. Examples of video representations 316 include a High Efficiency Video Coding (HEVC) representation 318 having a bitrate of 20 mbps and 4K resolution, an advanced video coding (AVC) representation 320 having a bitrate of 10 mbps and 1080p resolution, an AVC representation 322 having a bitrate of 5 mbps and 720p resolution, a VP8 representation 324 having a bitrate of 2 mbps and 720p resolution, a VGA representation 326 having a bitrate of 1.5 mbps, and a VGA representation 328 having a bitrate of 0.8 mbps. The media 314 can also include audio 330 and other content 332, such as closed-captioning content, extra content (e.g., interviews with actors, bonus tracks, or other extra content), or any other content that can be provided with the audio and video content.

Each of the video representations 316 has certain video characteristics. As one illustrative example, the HEVC representation 318 includes video characteristics 302. The video characteristics 302 include a bitrate 304 of 20 MBPS and a resolution 306 of 4K (e.g., a horizontal resolution on the order of approximately 4,000 pixels and vertical resolution on the order of approximately 2,000 pixels). The video characteristics 302 further include a certain frame rate 308, codec information 310 that can describe the codec requirements and other video coding related information, profile/level information 312, in addition to any other relevant characteristics.

In the example of FIG. 3, the current active video bitstream is the AVC representation 320 with an average bandwidth or bitrate of 10 mbps. One or more of the segments 340 in track 2 338 are therefore sent to the client device (or pulled by the client device using a request for the content) for processing (e.g., decoding, rendering, display, etc.), while other video representations (e.g., track 1 of the 4K HEVC representation 318) are not sent to the client device. The AVC representation 320 can be provided or requested based on current bandwidth conditions. When more bandwidth is detected (by the client device or a streaming server) and considered to be sufficient (e.g., higher than 20 mbps), a higher quality video representation can be sent to or requested by the client device. In one example, the 4K HEVC representation 318 can be provided to the client device when network bandwidth is detected to exceed 20 mbps. For instance, one or more of the segments 336 in track 1 334 can be streamed to the client device. Such a switching from one representation to another representation can be required to occur at a random access point of the target video representation, which might cause the switching to have delay (e.g., a 1-2 second delay).

Each of the video representations 316 has a full alternative bitstream having different video qualities, as shown in FIG. 3. To support more advanced applications, sub-bitstreams having different frame rates can be provided in separate tracks. For example, in HEVC, temporal scalability is supported to provide video content at varying frame rates (also referred to as picture rate). Each picture (or frame) can be associated with a TemporalId that indicates the temporal level of the picture. In one illustrative example, a first temporal sub-layer (with TemporalId=0, and referred to as a base temporal sub-layer 0) can provide video content at 15 frames per second (fps), a second temporal sub-layer (with TemporalId=1, and referred to as temporal sub-layer 1) can provide video content at 30 fps, a third temporal sub-layer (with TemporalId=2, and referred to as temporal sub-layer 2) can provide video content at 60 fps, and a fourth temporal sub-layer (with TemporalId=3, and referred to as temporal sub-layer 3) can provide video content at 120 fps. The value of TemporalId for a given picture can be indicated by a field in a Network Abstraction Layer (NAL) unit header.

There are limitations in directly applying auto-zoom to various video sources. In one example, for broadcasting applications, it is not easy for service providers to adapt to new features (e.g., new features in mobile devices, or other features) due to the lack of flexibility in adoption of new technologies as well as due to the tradition of 100% control of the Quality of Service (QoS).

The auto-zoom technology described above may also be used in video streaming, in which case the auto-zoom applies on top of a single video representation in a given period of time. Applying auto-zoom in video streaming might have issues. One issue may arise due to bandwidth not always being high enough to support a good quality video representation. For example, when bandwidth is low, a low quality video representation (e.g., a 720p resolution video representation) may be requested and/or sent to be decoded and processed by the client device to provide a region of interest for zooming. Based on the decoded video of lower quality, the region of interest would need to be upsampled to achieve a higher quality video. In one illustrative example, a client device display that supports 1080p rendering may select a region of interest (ROI) for zooming that is about ¼ size of a whole 720p picture. In such an example, the quality of the ROI, after being upsampled to 1080p, may be of lower quality, and thus may provide a bad user experience. Another issue may arise when a high quality video (e.g., corresponding to high resolution, such as 4K video, and/or a high frame rate) needs to be used to provide a good user experience, causing a need for increased bandwidth and a high processing time for the auto-zoom technology.

Systems and methods for providing auto-zoom based adaptive video streaming are described herein. Various embodiments are described for the auto-zoom based adaptive video streaming systems and methods. In some examples, the proposed system may be supported without any server side changes. In some examples, the proposed system may be supported without any video codec changes.

In other examples, changes to the server side and/or to a video codec may be made in order to implement the auto-zoom based adaptive video streaming.

In some embodiments, an auto-zoom based adaptive video streaming system and method provides a client side add-on feature so that any current streaming service (e.g., YouTube, Netflix, Hulu, or other suitable streaming service) can support a normal playing mode and at least one additional mode (namely auto-zoom playing mode). In one illustrative example, such an additional mode can be invoked by one or more inputs received using a user interface (UI) of a client device (e.g., a touch input of a touchscreen, a gesture, a button press, or other suitable input). When the additional auto-zoom mode is invoked, an auto-zoom based streaming system is used to provide a different user experience other than a normal playback mode of video content. The additional mode can also be disabled anytime (e.g., in response to receiving a user input through the UI of the client device) so the system can revert back to the normal playing mode. In some examples, one touch invocation of the auto-zoom playing mode can be combined with the one touch that is used for the tracking based auto-zoom methods described above. In some examples, separate UIs or multiple touches can be used to invoke the auto-zoom playing mode.

In some embodiments, in the auto-zoom playing mode, two video sources (e.g., bitstreams, tracks, video representations, sub-bitstreams, or the like) are utilized and sent to a client device in order to provide the best quality and bandwidth/complexity trade-off. For example, a first video source can include a lower quality video stream. The first video stream can be used by the auto-zoom technology to define one or more zoom regions (the regions of interest (ROIs)) for each frame or for a certain sub-sequence of video frames (e.g., a sequence of frames that contain an object being tracked, or other suitable sequence). In one illustrative example, the first video source (e.g., a video stream of a video representation) can include one of the VGA streams shown in FIG. 3, such as a bitstream carrying segments of the VGA representation 326 or a bitstream carrying segments of the VGA representation 328. In such an example, even though a VGA video representation has a relatively smaller field of view (FOV) as compared to higher quality representations, it could be used for the tracking based auto-zoom process to define the ROIs (the zoom regions). In some cases, the lower quality video can even be generated as a cropped and then downsampled video. The first video source used for defining the ROIs is herein referred to as a "tracking quality video stream" or a "tracking video stream."

A second video source (e.g., a video stream of a video representation) can include a high quality video stream (e.g., a high quality video representation) that can be used to get the zoomed-in region out (e.g., to obtain a zoom region for presentation). The second video source for obtaining the zoomed-in content is referred to herein as "target quality video stream" or a "target video stream." In some examples, since the high quality video representation already has more pixels for the corresponding zoom region, an upscaling process may not be needed. In some cases, if the zoomed-in region is always for a target output picture resolution, it may be upsampled or downsampled as needed. Examples of a high quality video representation can be the 4K HEVC representation 318, the 1080p AVC representation 320, the 720p AVC representation 322, or other suitable high quality video. In some examples, the highest quality video representation that can be supported by current bandwidth conditions can be used as the target quality video stream.

In some implementations, an additional video source (e.g., a video stream of a video representation) can be provided to the client device and used for normal play. Normal play, as used herein, refers to presentation of a media item when auto-zoom is not being used. The additional video source used for normal play is referred to herein as a "normal quality video stream" or a "normal video stream." The normal quality video stream has a video quality that is higher than the tracking quality video stream and that is lower than the target quality video stream. In one illustrative example, the target quality video stream can be the 4K HEVC video representation 318, the normal quality video stream can be the 720p AVC video representation 322, and the tracking quality video stream can be the VGA video representation 326. One of ordinary skill will appreciate that any other combination of video representations can be used for the target quality video stream, the normal quality video stream, and the tracking quality video stream. In some cases, an even lower resolution video (e.g., WQVGA) can be used as the tracking quality video for the auto-zoom technology to identify one or more ROIs.

The normal quality video stream can be played until the auto-zoom playing mode is invoked (e.g., in response to receiving user input through a UI of the client device) and the pixels from the target quality video stream are ready for rendering. For example, the normal quality video stream (e.g., the 720p AVC video representation 322) can be playing until the auto-zoom playing mode is invoked, after which the client device can receive the zoom region of the target quality video stream (e.g., the 4K HEVC video representation 318). Once the frames of the target quality video stream are rendered and ready for display, the zoom region can be displayed by the client device.

In some examples, the normal quality video can be the same as the tracking quality video. For example, in some cases, only two video streams can be utilized (a separate normal quality video stream is not used). In such cases, the tracking quality video stream can play until the auto-zoom playing mode is invoked and the pixels of the target quality video stream are ready for rendering.

In some embodiments, transition from a normal playing mode to an auto-zoom playing mode may have delays until the target quality video is being random accessed, decoded and sub sampled. Different embodiments are described for such a scenario. In one embodiment, the normal quality video can continue playing until the transition to the auto-zoom playing mode is finished (e.g., the transition is finished when pixels of a random access picture are ready for rendering) and the zoomed-in video (the zoom region) of the target video stream can start to play. In another embodiment, the normal quality video is used to provide the zoom region (e.g., for playing) until the zoom region from the target video stream is ready for rendering. For example, the zoom region can be cropped from one or more frames of the normal quality video stream to obtain a cropped ROI. The cropped ROI can then be upsampled. The upsampled video can start playing the zoomed-in video (with a relative lower quality) until the full transition to the auto-zoom playing mode (of the target video stream) is done and the high quality zoomed-in video can be played.

The above definitions of normal quality video, target quality video, and tracking quality video are relative and can be made dynamic. For example, when the bandwidth of one or more communication channels deteriorates, the different quality video streams can be adjusted. In one illustrative example, the normal quality video can adjusted to be a VGA representation, but may otherwise be 720p when bandwidth conditions are at a normal level. In another example, the target quality video can be a 4K HEVC representation, but when bandwidth is not sufficient to support such a high-quality representation, the target quality video can be changed to a 1080p representation. One of ordinary skill in the art will appreciate that the different qualities (target quality video, normal quality video, and tracking quality video) can be any suitable video resolution and/or frame rate.

FIG. 4 is a flowchart illustrating an example of a process 400 for performing one or more of the auto-zoom based streaming techniques described above. The process 400 uses only two video streams, including a tracking quality video stream and a target quality video stream. At block 402, a client device receives the tracking video stream. In one example, the tracking video stream includes video frames of a VGA video representation. The frames of the tracking video stream can be displayed as normal when an auto-zoom feature is not being used.

In response to an input indicating selection of the auto-zoom feature is received, the auto-zoom process can begin. In some examples, the tracking-based auto-zoom process described above with respect to FIG. 1 and FIG. 2 can be performed. For example, at block 404, in response to the auto-zoom feature being invoked, the client device identifies one or more ROIs (or zoom regions) in one or more frames of the tracking video stream. In some examples, the ROIs can be identified automatically based on an object detected in the video, such as a ball in a sporting event. For instance, the auto-zoom process can identify the object as one that should be tracked, and can track the object as it moves from frame to frame. The region around the tracked object can be referred to as the tracking region, as described above with reference to FIG. 2. The auto-zoom process can then determine a zoom region surrounding a tracking region as an ROI that will be zoomed. In some examples, the ROIs can be identified based on user input selecting an object to be tracked.

Once the one or more ROIs in the tracking video stream have been identified, corresponding ROIs are identified in the target video stream at block 406. In one illustrative example, the target video stream includes video frames of a 4 k HEVC representation. In some implementations, the client device can send an identification of the ROIs of the tracking video stream to a streaming server. For example, the client device can send the coordinates of portions of video frames that contain the ROIs (e.g., pixels, blocks, slices, tiles as described below, or any other portion of video frames) to the streaming server. The streaming server can map the locations of the ROIs of the tracking video stream to corresponding locations in video frames of the target video stream to identify the ROIs in frames of the target video stream that will be provided to the client device for zoomed display. The streaming server is aware of how different representations having different video qualities map to one another, so when determining the ROIs in the target stream, the server can map the ROIs from the tracking video stream to the target video stream. For example, the coordinates of different resolutions can be mapped to each other to identify the ROIs. In some implementations, the client device can send an indication of the object being tracked to the streaming server. The server can identify the ROIs in the target video stream based on where the tracked object is in the frames of the target video stream that will be provided to the client device for zoomed display, as described above with respect to FIG. 1 and FIG. 2.

At block 408, video data corresponding to the ROIs in the target video stream are provided to the client device. For example, the server can crop portions of the frames of the target video stream that contain the ROIs. Only the cropped portions of the frames identified as belonging to the identified ROIs are sent by the streaming server to the client device. As described in more detail below, a video frame can be made up of independently decodable sections (e.g., slices, tiles, or the like). In some examples, only the independently decodable sections of the frames belonging to the identified ROIs are sent to the client device for rendering the zoom region. The client device can then display the zoom region along with the tracking video stream. For example, the zoomed ROI can be displayed in a smaller window (e.g., a PiP window) that is overlaid over the tracking video stream being displayed in the full display picture. In some cases, the zoomed ROI can be displayed in the full display picture. By providing only the portions of the target video stream frames that are necessary for displaying the zoomed content, bandwidth can be reduced while quality of the zoomed content can be maintained.

Figure 5:
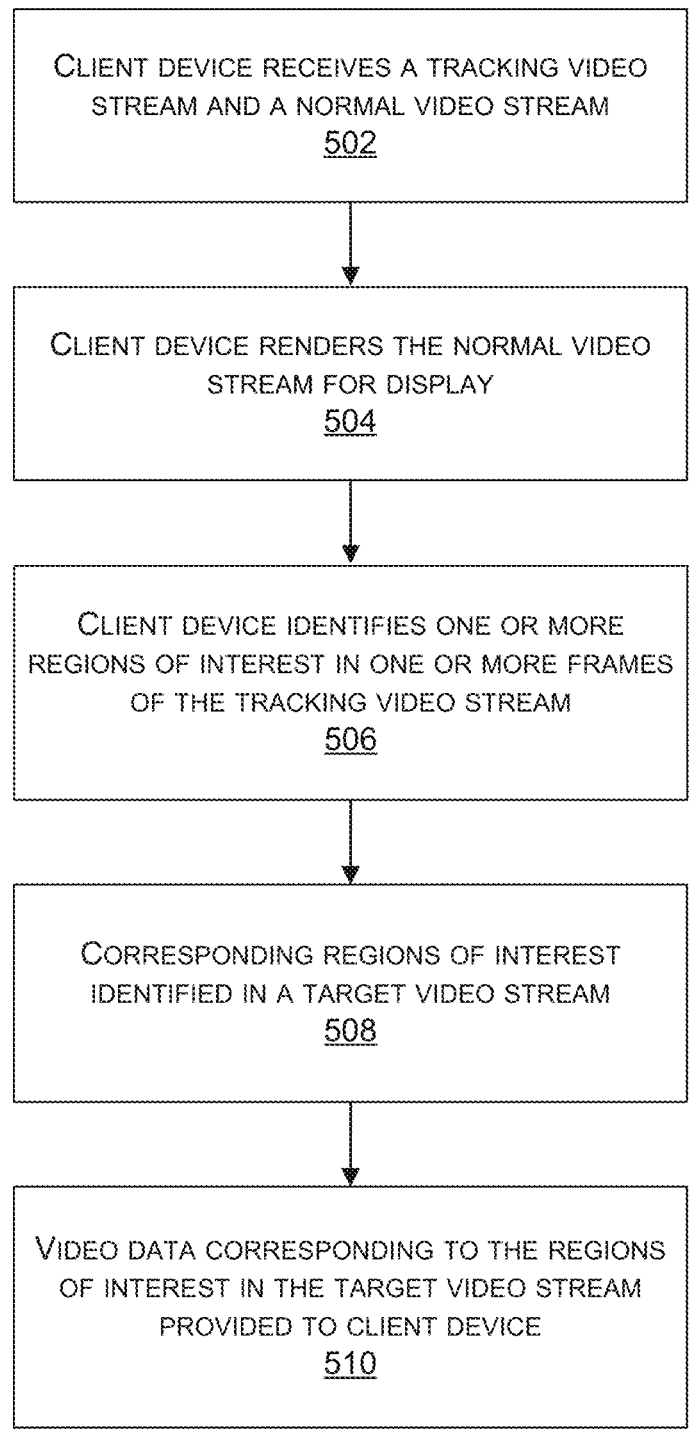
FIG. 5 is a flow diagram illustrating another example of a process of performing automatic zoom using multiple video sources, in accordance with some examples.

FIG. 5 is a flowchart illustrating another example of a process 500 for performing one or more of the auto-zoom based streaming techniques described above. The process 500 utilizes three video streams, including a tracking quality video stream, a normal quality video stream, and a target quality video stream. At block 502, a client device receives the tracking video stream and the normal video stream. In one example, the tracking video stream includes video frames of a VGA video representation, and the normal video stream includes a 1080p AVC video representation. At block 504, the client device displays the normal video stream. For example, frames of the normal video stream can be displayed in a normal mode when an auto-zoom feature is not being used.

Once an input indicating selection of the auto-zoom feature is received, the auto-zoom process can begin. For example, at block 506, in response to the auto-zoom process being invoked, the client device identifies one or more ROIs (tracking regions) in one or more frames of the tracking video stream. In some examples, the ROIs can be identified automatically based on an object detected in the video, such as a particular player in a sporting event. As described above, the auto-zoom process can identify the object as one that should be tracked, and can track a tracking region surrounding the object as it moves from frame to frame. The auto-zoom process can then determine a zoom region surrounding the tracking region as an ROI that will be zoomed. In some examples, the ROIs can be identified based on user input selecting an object to be tracked Once the one or more ROIs in the tracking video stream have been identified, corresponding ROIs in the target video stream are identified at block 508. In one example, the target video stream includes video frames of a 4 k HEVC representation. In some implementations, the client device can send an identification of the ROIs of the tracking video stream to a streaming server. For example, the client device can send the coordinates of portions of video frames that contain the ROIs (e.g., pixels, blocks, slices, tiles as described below, or any other portion of video frames) to the streaming server. The streaming server can map the locations of the ROIs of the tracking video stream to corresponding locations in video frames of the target video stream to identify the ROIs in frames of the target video stream that will be provided to the client device for zoomed display. For example, the coordinates of different resolutions can be mapped to each other to identify the ROIs. In some implementations, the client device can send an indication of the object being tracked to the streaming server. The server can identify the ROIs in the target video stream based on where the tracked object is in the frames of the target video stream that will be provided to the client device for zoomed display.

At block 510, video data corresponding to the ROIs in the target video stream are provided to the client device. For example, the server can crop portions of the frames of the target video stream that contain the ROIs. Only the cropped portions of the frames identified as belonging to the identified ROIs are sent by the streaming server to the client device. In some examples, only the independently decodable sections of the frames (e.g., slices, tiles, or the like) belonging to the identified ROIs are sent to the client device for rendering the zoom region. The client device can then display the zoom region along with the normal video stream. For example, the zoomed ROI can be displayed in a smaller window (e.g., a PiP window) that is overlaid over the normal video stream being displayed in the full display picture. In some cases, the zoomed ROI can be displayed in the full display picture.

As described in more detail below with reference to FIG. 11 and FIG. 12, various coding standards are used for coding pictures. For example, MPEG-2 (aka H.222/H.262 as defined by the ITU) is a standard for "the generic coding of moving pictures" and ISO/IEC 13818 MPEG-2 at the ISO Store. It describes a combination of lossy video compression and lossy audio data compression methods, which permit storage and transmission of movies using currently available storage media and transmission bandwidth. While MPEG-2 as a video codec may not be as efficient as newer standards, such as H.264 and H.265/HEVC, backwards compatibility with existing hardware and software means it is still widely used, for example in over-the-air digital television broadcasting and in the DVD-Video standard.

H.264 or MPEG-4 Part 10, Advanced Video Coding (MPEG-4 AVC) is a block-oriented motion-compensation-based video compression standard that is currently one of the most commonly used formats for the recording, compression, and distribution of video content.

An intent of the H.264/AVC project was to create a standard capable of providing good video quality at substantially lower bit rates than previous standards (e.g., half or less the bit rate of MPEG-2, H.263, or MPEG-4 Part 2), without increasing the complexity of design so much that it would be impractical or excessively expensive to implement. An additional goal was to provide enough flexibility to allow the standard to be applied to a wide variety of applications on a wide variety of networks and systems, including low and high bit rates, low and high resolution video, broadcast, DVD storage, RTP/TP packet networks, and ITU-T multimedia telephony systems.

High Efficiency Video Coding (HEVC), also known as H.265, is a video compression standard, one of several potential successors to the widely used AVC (H.264 or MPEG-4 Part 10). In comparison to AVC, HEVC offers about double the data compression ratio at the same level of video quality, or substantially improved video quality at the same bit rate. It supports resolutions up to 8192×4320, including 8K UHD.

VP8 and VP9 are proprietary video coding formats owned/developed by Google. Chromium, Chrome, Firefox, and Opera support playing VP9 video format in the HTML5 video tag. YouTube is using more and more of Google proprietary codec compliant video content.

Figure 6:
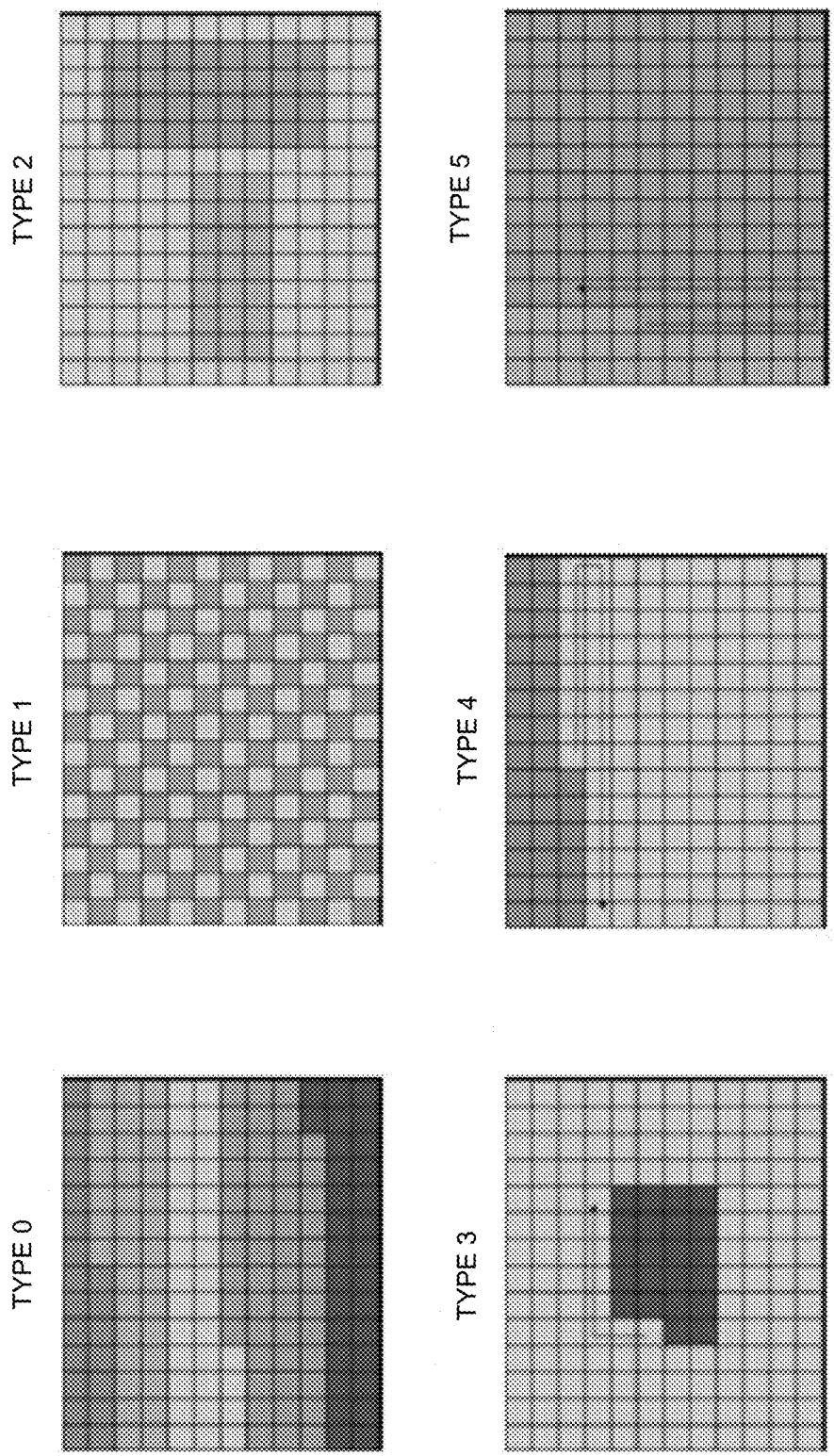
FIG. 6 is a diagram illustrating different slice types supported by H.264/AVC, in accordance with some examples.

The different coding standards provide various features, as described in more detail below. One feature includes independently decodable portions of a video picture. For example, in both H.264/AVC and H.265/HEVC, slices are supported. FIG. 6 is a diagram illustrating different slice types supported by H.264/AVC. One example slice type is slice type 0, where coded blocks are put in slices in raster scan decoding order. H.265/HEVC also supports the type 0 slicing. Slice types 1-5 are also shown in FIG. 6. The slices (in both H.264 and H.265) were designed, in part, for error resilience, so that the slices are partitioned typically based on the size of the package that will contain the slices. Slices of different frames are not spatially aligned as a requirement from the decoder, although the encoder can be intelligently configured to do so.

Figure 7:
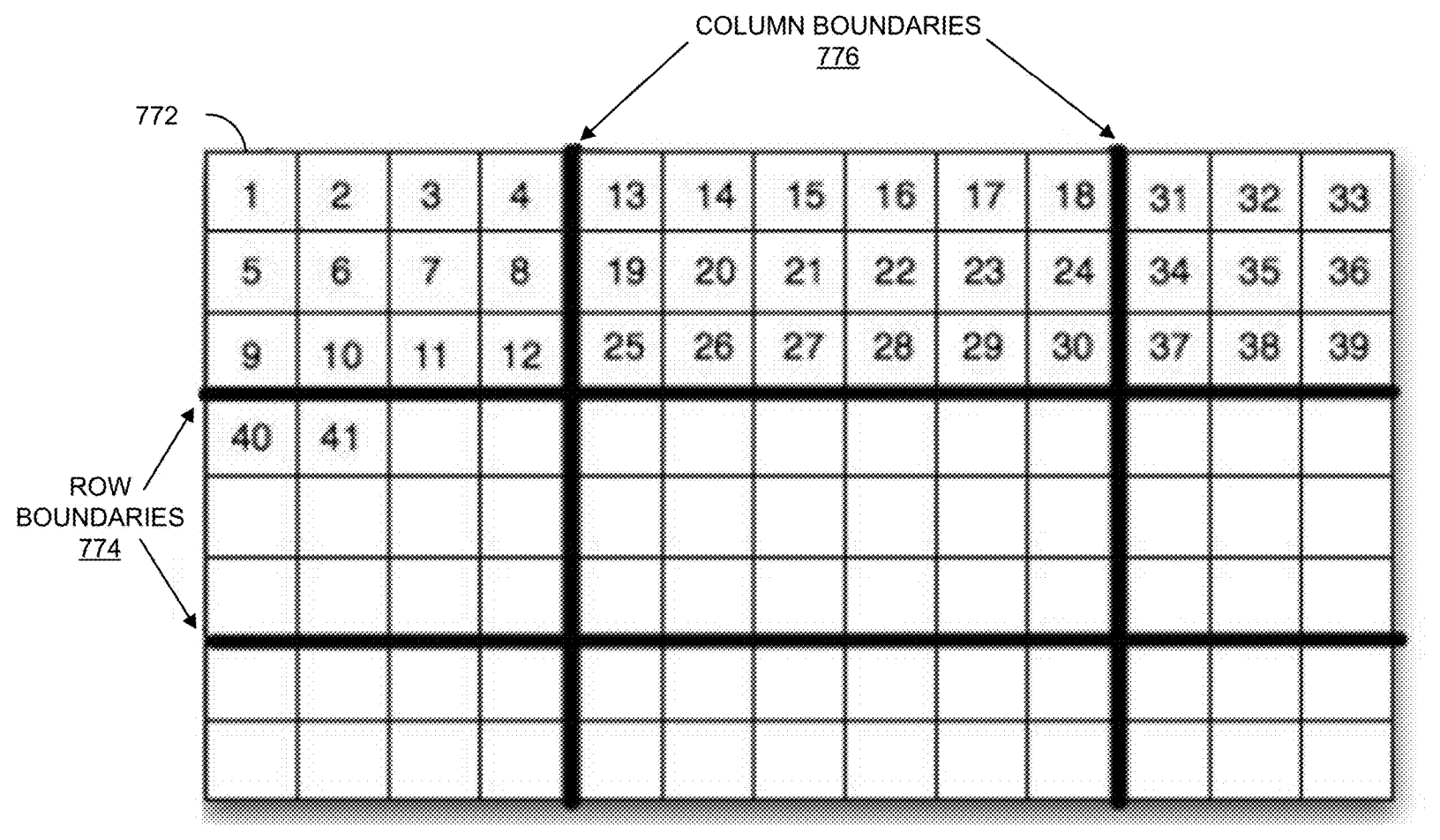

In addition to supporting slices, H.265/HEVC also supports tile-based video coding. FIG. 7 shows an example of a picture with tiles. As shown in FIG. 7, each tile corresponds to a specific portion (e.g., a rectangle) of the whole decoded image frame. The tiles are separated by row boundaries 774 and column boundaries 776. Each of the numbered boxes is a largest coding unit (LCU). For example, LCU 1 772 is a coding unit within a first tile. In particular, the first tile includes LCUs 1-4, 5-8, and 9-12. Similar to a slice, a tile can be independently decoded. In some cases, tiles can be independently decoded in parallel. In addition, each tile (with a certain identifier (ID)) is co-located (e.g., fully overlapped) with tiles in other frames with the same ID.

In some implementations, the auto-zoom based adaptive streaming techniques described herein can take advantage of the tile-based video coding of H.264/AVC and H.265/HEVC. For example, in order to achieve a good user experience and to get the highest possible quality for the target quality video, a server can produce tile-based video coding for certain video representations (e.g., 4K video, 1080p video, or other suitable high-quality video). Such a tiling support can be standard compliant and may be employed for other purposes as well.

In some implementations, the tracking quality video stream, the normal quality video stream, and/or the target quality video stream can have tile-based video coding supported. In some implementations, only the target quality video stream has tile-based video coding supported. In examples in which frames (or pictures) of the target quality video are coded using tile-based video coding, an ROI (identified using the tracking video stream) can be used to identify only the relevant tiles in the target video stream that are covered by the ROI. Only the tiles associated with the ROI can be sent to the client device for rendering. Such a technique requires a much lower bandwidth to get just a subset of the target quality video.

Figure 8:
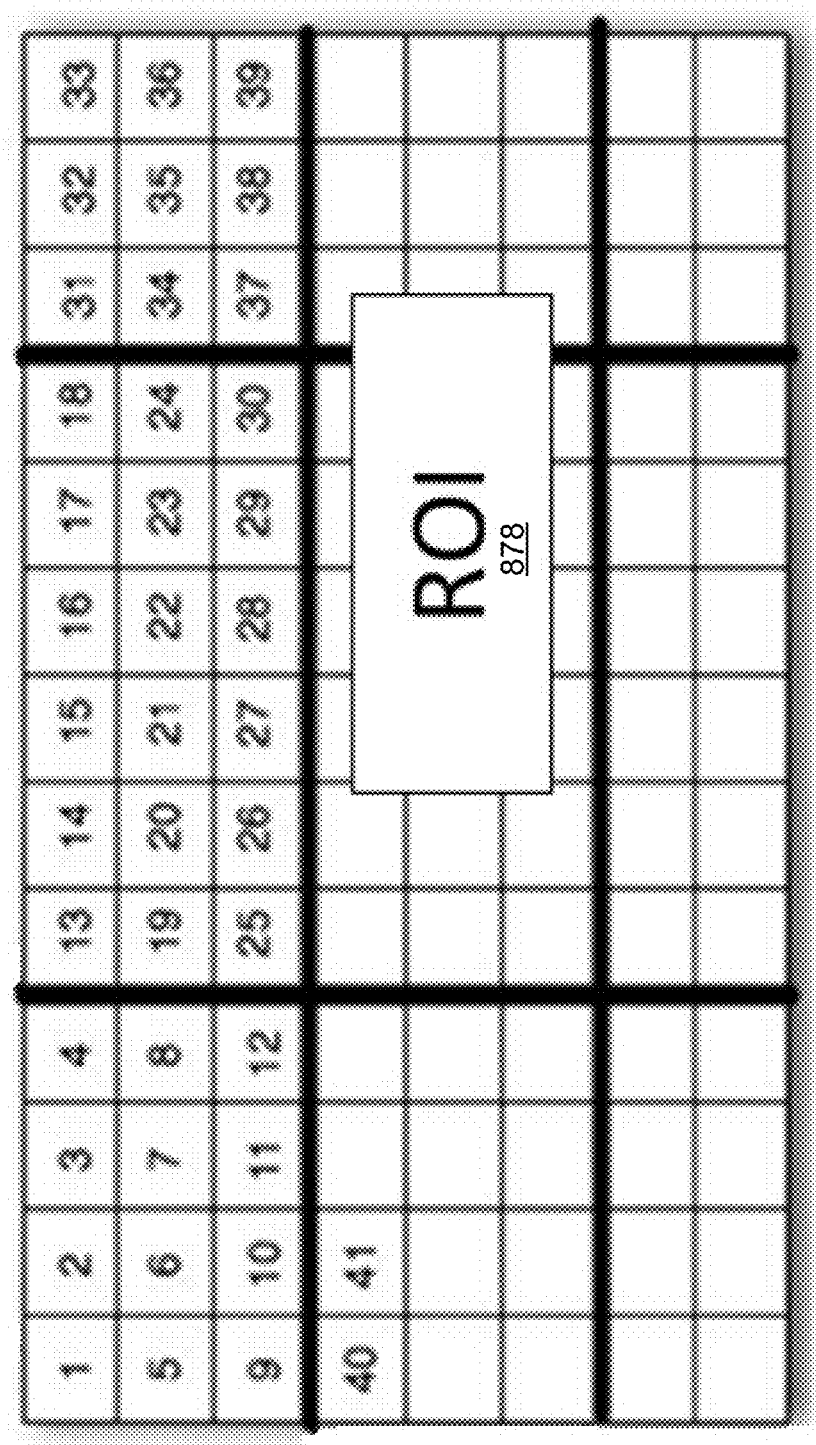
FIG. 8 is a block diagram illustrating an example of a region of interest in a frame covering two tiles of the frame, in accordance with some examples.

FIG. 8 is a block diagram illustrating an example of a ROI 878 in a frame. As described above, the ROI 878 can be determined using frames of a tracking quality video stream. As shown in FIG. 8, the ROI 878 covers two tiles of the nine tiles in the frame. In such an example, only two tiles are needed to provide the ROI 878 that can be used as the zoom region for displaying zoomed. Using only two tiles of the nine available tiles reduces the bandwidth needed to transmit the zoom region. In one illustrative example, using two tiles can reduce the bandwidth by a factor of three (e.g., from 20 mbps to about 7 mbps). Referring to blocks 408 and 510 of FIGS. 4 and 5, respectively, the two tiles of the target video stream that correspond to the ROI 878 can be provided to the client device. Using these two tiles, the client device can decode the required video data to provide the zoomed ROI 878.

Figure 9:
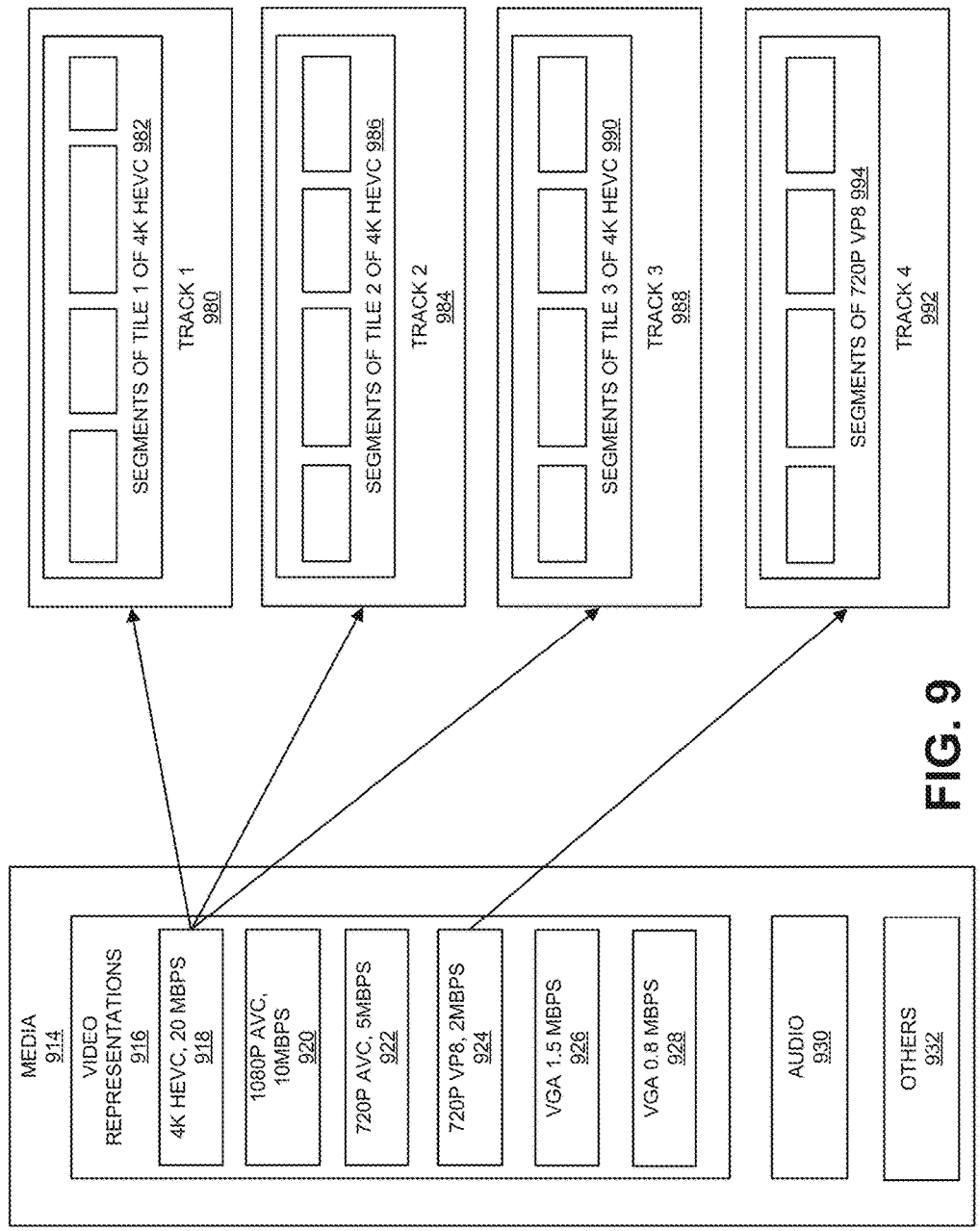
FIG. 9 is a block diagram illustrating an example of a video streaming model for a media item utilizing tile-based video coding, in accordance with some examples.

In some implementations, in order to achieve such a tile-based technique, tiles can be arranged in separate tracks at the streaming server. For example, FIG. 9 is a block diagram illustrating an example of a video streaming model for a media item utilizing tile-based video coding. In the example shown in FIG. 9, the 4K HEVC video representation 918 is used as the target video stream, and the 720p VP8 video representation 924 is used as the tracking video stream. In some examples, a third video representation could be used as the normal video stream, such as the 1080p AVC representation 920 or the 720p AVC representation 922.

The target video stream is encoded using tile-based video coding, resulting in tiled video frames, such as the frame shown in FIG. 8. Each tile of a frame is provided in a separate track at the streaming server. Each track can include a track of a file generated using a standard file format (e.g., an ISO Base Media File Format (ISOBMFF), or other suitable media file format). For example, track 1 980 includes segments 982 of a first tile (with tile ID=1) of the 4K HEVC video representation 918, track 2 984 includes segments 986 of a second tile (with tile ID=2) of the 4K HEVC video representation 918, and track 3 988 includes segments 990 of a third tile (with tile ID=3) of the 4K HEVC video representation 918.

The lower quality 720p VP8 video representation 924 can be set as the tracking quality video stream (and in some cases, also as the normal quality video stream). In some examples, the tracking video stream (and the normal video stream, when used) are not encoded using tile-based video coding. The track 4 992 includes the segments 994 of the 720p VP8 video representation 924.

In the example of FIG. 9, it can be assumed that the 4K HEVC video representation 918 is split into three tiles. In one illustrative example, the ROI identified using the tracking video stream is determined to be within tile 2 (in track 2 984). In this example, track 2 984 and track 4 992 are required for transmission to allow rendering and display of the normal video (the 720p VP8 video) and the zoomed video containing the video data for the ROI. Therefore, in such an example, altogether about 9 mbps is needed to provide the best quality auto-zoom experience. Using the video data from track 2 984 and track 4 992, the tracking video stream can be displayed in the full FOV of the display and the high-quality zoomed video can be displayed along with the tracking video stream (e.g., in a PiP window, in a separate window, or the like). Alternatively, the high-quality zoomed video content can be displayed alone in the full FOV of the display.

In another example, normal quality video can be used in addition to the tracking quality video and the target quality video. For example, the normal quality video can be the 1080p AVC video representation 920. In such an example, in normal playing mode, frames of the 1080p video representation 920 are streamed with a bandwidth of 10 mbps, while in auto-zoom playing mode, the bandwidth could be similar. In some examples, if only one video clip is allowed, to provide the best quality video service, a 20 mbps bitrate can be required.

In some embodiments, the tracking quality video can be of lower frame rate (in addition to or in lieu of a lower resolution) to further reduce the bandwidth. A lower frame rate video representation can also be put in a separate track so that a sub-bitstream, instead of a whole bitstream, for the tacking quality video can be conveniently requested. For example, a sub-bitstream me include only the frames of the bitstream required to achieve a certain frame rate.

For the tile-based video coding examples described above, information related to an identified ROI, including bounding box information for the ROI and how the bounding box maps to the target quality video pictures, as well as how the bounding box maps to the final display picture in the client device, may need to be used during the negotiation process (as part of the adaptation) so that the correct tiles can be obtained by the streaming server. For example, coordinates of a bounding box for a ROI can be provided by the client to the server so that the server can map the coordinates from the tracking video to the target video. For example, a streaming server can map the locations of an ROI in a frame of the tracking video stream to a corresponding location in a video frame of the target video stream to identify the ROI in the frame of the target video stream that corresponds to the ROI of the tracking video stream. As described above, the coordinates of different video resolutions can be mapped to each other to identify the ROIs. The server can return the video data needed to display the zoom region (e.g., one or more tiles) and where within the video data the ROI is located, such as by providing coordinates of the ROI within the video data. In some examples, the client device can send an indication of the object being tracked to the streaming server. The server can identify the ROIs in the target video stream based on where the tracked object is in the frames of the target video stream that will be provided to the client device for zoomed display.

In some embodiments, ROI related information (e.g., tile location information, or other information needed to render a zoom region) may be present in a supplemental enhancement information (SEI) message, attached on a per frame level (e.g., one SEI message per frame). SEI messages can be included in video bitstreams. In some cases, SEI messages may be used to carry information that is not essential in order to decode the bitstream by the decoder, but that can be used to improve the display or processing of the decoded output. In one illustrative example, the information in an SEI message could be used by decoder-side entities to improve the viewability of the content. SEI messages can also be used to carry information needed to decode video content, such as the ROI-related information described above (e.g., tiles needed to render a zoom region). Therefore, if a standard codec (e.g., an HEVC codec or other suitable codec) supports such an SEI message, the codec can have a normative process of decoding only the relevant tiles as well as outputting just the ROI defined in the SEI message.

In some embodiments, the tile location information is present in the movie header or other easily accessible places of a file (e.g., a file compliant to ISOBMFF), such that the information can be easily used to identify which tiles to be accessed real-time.

Figure 10:
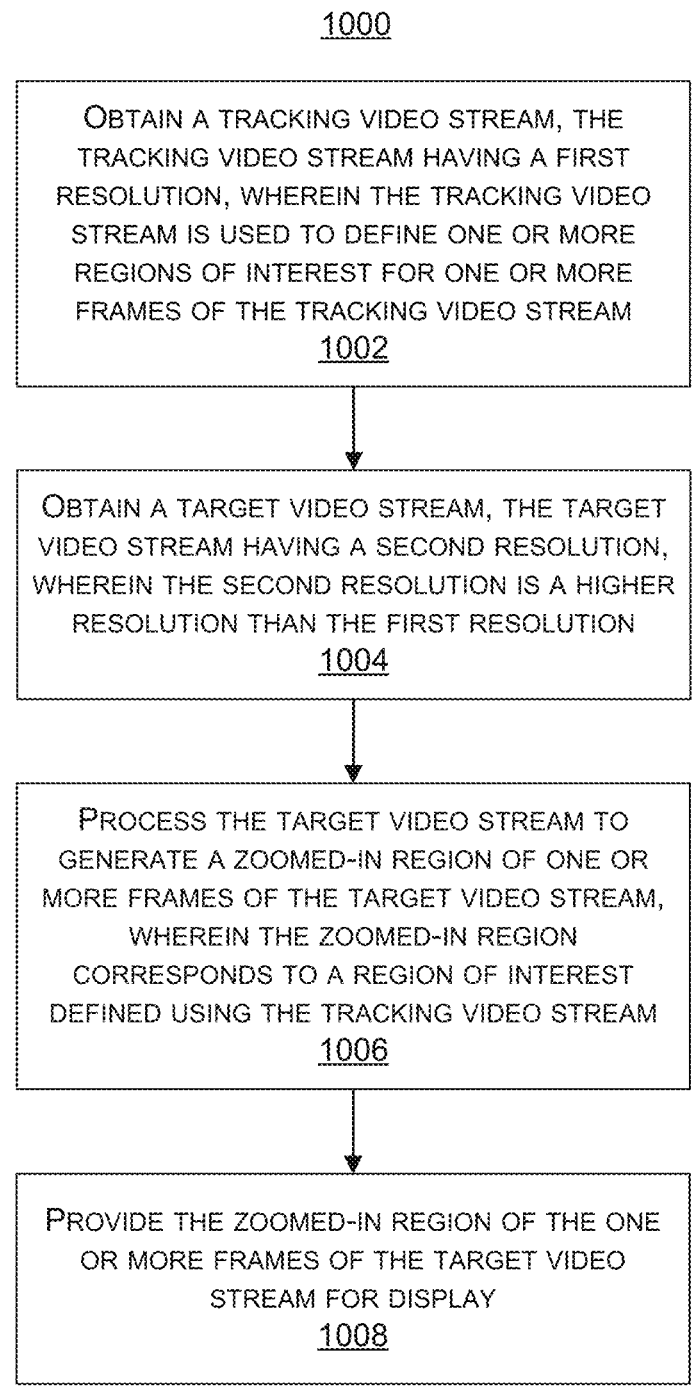
FIG. 10 is a flow diagram illustrating an example of a process of processing video data, in accordance with some examples.

FIG. 10 illustrates an example of a process 1000 of processing video data using one or more of the techniques described herein. At block 1002, the process 1000 includes obtaining a tracking video stream. The tracking video stream has a first resolution. The tracking video stream is used to define one or more regions of interest for one or more frames of the tracking video stream. For example, as previously described, the auto-zoom process can be used to identify regions of interest in the one or more frames tracking video stream.

At block 1004, the process 1000 includes obtaining a target video stream. The target video stream has a second resolution. The second resolution (of the target stream) is a higher resolution than the first resolution (of the tracking stream). In one illustrative example, the tracking video stream includes the 720p AVC video representation 922 shown in FIG. 9, and the target video stream includes the 4K HEVC video representation 918.

At block 1006, the process 1000 includes processing the target video stream to generate a zoomed-in region of one or more frames of the target video stream. The zoomed-in region corresponds to a region of interest defined using the tracking video stream. For example, as previously described, a streaming server can receive an indication of a location of a region of interest in the tracking video stream, and can identify locations within the one or more frames of the target video stream that correspond to the region of interest.

At block 1008, the process 1000 includes providing the zoomed-in region of the one or more frames of the target video stream for display. For example, a streaming server can provide only the video data necessary (the zoomed-in region of the one or more frames) to render zoomed content with a high resolution.

In some examples, the process 1000 includes obtaining a normal video stream that has a lower resolution than the second resolution and a higher resolution than the first resolution. For example, the normal video stream can include the 1080p AVC video representation 920 shown in FIG. 9. The process 1000 can include providing the normal video stream for display until a transition to an auto-zoom playing mode is made. The zoomed-in region of the one or more frames of the target video stream is displayed in the auto-zoom playing mode.

In some examples, the zoomed-in region of the one or more frames of the target video stream is displayed in response to input requesting the transition to the auto-zoom playing mode. For example, a client device may receive input requesting a transition to the auto-zoom playing mode in response to a user selecting an option to invoke the auto-zoom playing mode. The zoomed-in region of the target video stream can then be displayed as zoomed content in response to the input requesting the transition to the auto-zoom playing mode.

In some implementations, the normal video stream is displayed after the input requesting the transition to the auto-zoom playing mode is received and until pixels of the zoomed-in region of the one or more frames of the target video stream are ready for rendering. In some examples, the normal video stream is processed to generate a zoomed-in region of one or more frames of the normal video stream in response to an input requesting the transition to the auto-zoom playing mode. For example, the zoomed-in region of the normal video stream can used during the transition to displayed the zoomed-in region of the target video stream due to delays while the target video is being random accessed at a random access point. The zoomed-in region of the normal video stream corresponds to the region of interest defined using the tracking video stream. The zoomed-in region of the one or more frames of the normal video stream is displayed until pixels of the zoomed-in region of the one or more frames of the target video stream are ready for rendering. The zoomed-in region of the one or more frames of the target video stream is then displayed when the pixels of the zoomed-in region of the one or more frames of the target video stream are ready for rendering or display.

For example, a client device may receive input requesting the auto-zoom playing mode. The normal video stream may then be processed to generate the zoomed-in region of the one or more frames of the normal video stream. For instance, the frames of the normal video stream can be cropped and upsampled. The cropped and upsampled video data can be displayed until the zoomed-in region of the one or more frames of the target video stream are ready for rendering. The zoomed-in region of the one or more frames of the target video stream are displayed once the pixels of the zoomed-in region of the one or more frames of the target video stream are ready for rendering or display.

In some examples, the normal video stream is the same as the tracking video stream having the first resolution. For example, in some cases, only two video streams can be utilized, in which case the normal video stream is also the tracking video stream. In such cases, the tracking video stream can play until the auto-zoom playing mode is invoked and the pixels of the target quality video stream are ready for rendering.

In some examples, the normal video stream is displayed in response to receiving input requesting a transition from the auto-zoom playing mode to the normal mode. For example, the client device can receive input requesting a transition back to the normal playing mode.

In some cases, resolutions of the normal video stream, the target video stream, and the tracking video stream are dynamically adjustable based on bandwidth of one or more channels over which the normal video stream, the target video stream, and the tracking video stream are received. For example, the bandwidth of one or more communication channels can deteriorate, in which case the different video streams can be adjusted to include other video representations. In one illustrative example, the normal video stream can adjusted to be a VGA representation, the target quality video can be changed to a 1080p representation, and the tracking video stream can be changed to a 720p representation. One of ordinary skill in the art will appreciate that the different qualities (target quality video, normal quality video, and tracking quality video) can be any suitable video resolution and/or frame rate.

In some aspects, the tracking video stream has a first frame rate and the target video stream has a second frame rate. The second frame rate is a higher frame rate than the first frame rate.

In some examples, the target video stream includes one or more frames coded using tile-based video coding. For example, the one or more frames can be divided into a plurality of tiles. In such examples, the process 1000 further includes identifying at least one tile in a frame of the target video stream. The at least one tile corresponds to the zoomed-in region of the target video stream, and is identified using information related to the region of interest defined using the tracking video stream. For example, the zoomed-in region of interest can be located within two tiles of the frame. In some examples, the information related to the region of interest includes bounding box information and information describing how the bounding box maps to the frame. In some aspects, each tile of the plurality of tiles is arranged in a separate track.

In some examples, a zoomed-in region of a first frame is mapped to a first plurality of tiles of the first frame, the first plurality of tiles being different than a second plurality of tiles of a second frame. The first plurality of tiles of the first frame and the second plurality of tiles of the second frame are not co-located. For example, as noted previously, each tile (with a certain identifier (ID)) is co-located (e.g., fully overlapped) with tiles in other frames with the same tile ID. By not being co-located, one or more tiles of the first plurality of tiles of the first frame have different tile IDs than the tile IDs of one or more tiles of the second plurality of tiles of the second frame.

Using the techniques described herein, a lower quality video source can be used to identify regions of interest, while a higher quality video source can be used to render zoomed content that requires a higher quality for quality presentation. Further, only necessary portions of video data needed to render the zoomed content can be provided to a client device, saving vital bandwidth resources.

In some examples, the process 1000 may be performed by a computing device or an apparatus. For example, the process 1000 can be performed by a streaming server, the client device 152 shown in FIG. 1, the encoding device 1104 shown in FIG. 11, the decoding device 1212 shown in FIG. 12, or by another other server-side or client-side device. In some cases, the computing device or apparatus may include a processor, microprocessor, microcomputer, or other component of a device that is configured to carry out the steps of process 1000. In some examples, the computing device or apparatus may include a camera configured to capture video data (e.g., a video sequence) including video frames. In some examples, a camera or other capture device that captures the video data is separate from the computing device, in which case the computing device receives or obtains the captured video data. The computing device may further include a network interface configured to communicate the video data. The network interface may be configured to communicate Internet Protocol (IP) based data or other type of data. In some examples, the computing device or apparatus may include a display for displaying output video content.

Process 1000 is illustrated as logical flow diagrams, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 1000 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

The techniques discussed herein may be implemented using compressed video or using uncompressed video frames (before or after compression). Video data includes large amounts of data to meet the demands of consumers and video providers. As more devices and systems provide consumers with the ability to consume digital video data, the need for efficient video coding techniques becomes more important. Video coding is needed to reduce storage and transmission requirements necessary to handle the large amounts of data present in digital video data. Various video coding techniques may be used to compress video data into a form that uses a lower bit rate while maintaining high video quality.

An example video encoding and decoding system includes a source device that provides encoded video data to be decoded at a later time by a destination device. In particular, the source device provides the video data to destination device via a computer-readable medium. The source device and the destination device may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, the source device and the destination device may be equipped for wireless communication.

The destination device may receive the encoded video data to be decoded via the computer-readable medium. The computer-readable medium may comprise any type of medium or device capable of moving the encoded video data from source device to destination device. In one example, computer-readable medium may comprise a communication medium to enable source device to transmit encoded video data directly to destination device in real-time. The encoded video data may be modulated according to a communication standard, such as a wireless communication protocol, and transmitted to destination device. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device to destination device.

In some examples, encoded data may be output from output interface to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device. Destination device may access stored video data from the storage device via streaming or download. The file server may be any type of server capable of storing encoded video data and transmitting that encoded video data to the destination device. Example file servers include a web server (e.g., for a website), an FTP server, network attached storage (NAS) devices, or a local disk drive. Destination device may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system may be configured to support one-way or two-way video transmission to support applications such as video streaming, video playback, video broadcasting, and/or video telephony.

In one example the source device includes a video source, a video encoder, and a output interface. The destination device may include an input interface, a video decoder, and a display device. The video encoder of source device may be configured to apply the techniques disclosed herein. In other examples, a source device and a destination device may include other components or arrangements. For example, the source device may receive video data from an external video source, such as an external camera. Likewise, the destination device may interface with an external display device, rather than including an integrated display device.

The example system above is merely one example. Techniques for processing video data in parallel may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device and destination device are merely examples of such coding devices in which source device generates coded video data for transmission to destination device. In some examples, the source and destination devices may operate in a substantially symmetrical manner such that each of the devices include video encoding and decoding components. Hence, example systems may support one-way or two-way video transmission between video devices, e.g., for video streaming, video playback, video broadcasting, or video telephony.

The video source may include a video capture device, such as a video camera, a video archive containing previously captured video, and/or a video feed interface to receive video from a video content provider. As a further alternative, the video source may generate computer graphics-based data as the source video, or a combination of live video, archived video, and computer-generated video. In some cases, if video source is a video camera, source device and destination device may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by the video encoder. The encoded video information may then be output by output interface onto the computer-readable medium.

As noted the computer-readable medium may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from the source device and provide the encoded video data to the destination device, e.g., via network transmission. Similarly, a computing device of a medium production facility, such as a disc stamping facility, may receive encoded video data from the source device and produce a disc containing the encoded video data. Therefore, the computer-readable medium may be understood to include one or more computer-readable media of various forms, in various examples.

The input interface of the destination device receives information from the computer-readable medium. The information of the computer-readable medium may include syntax information defined by the video encoder, which is also used by the video decoder, that includes syntax elements that describe characteristics and/or processing of blocks and other coded units, e.g., group of pictures (GOP). A display device displays the decoded video data to a user, and may comprise any of a variety of display devices such as a cathode ray tube (CRT), a liquid crystal display (LCD), a plasma display, an organic light emitting diode (OLED) display, or another type of display device. Various embodiments of the invention have been described.

Figure 11:
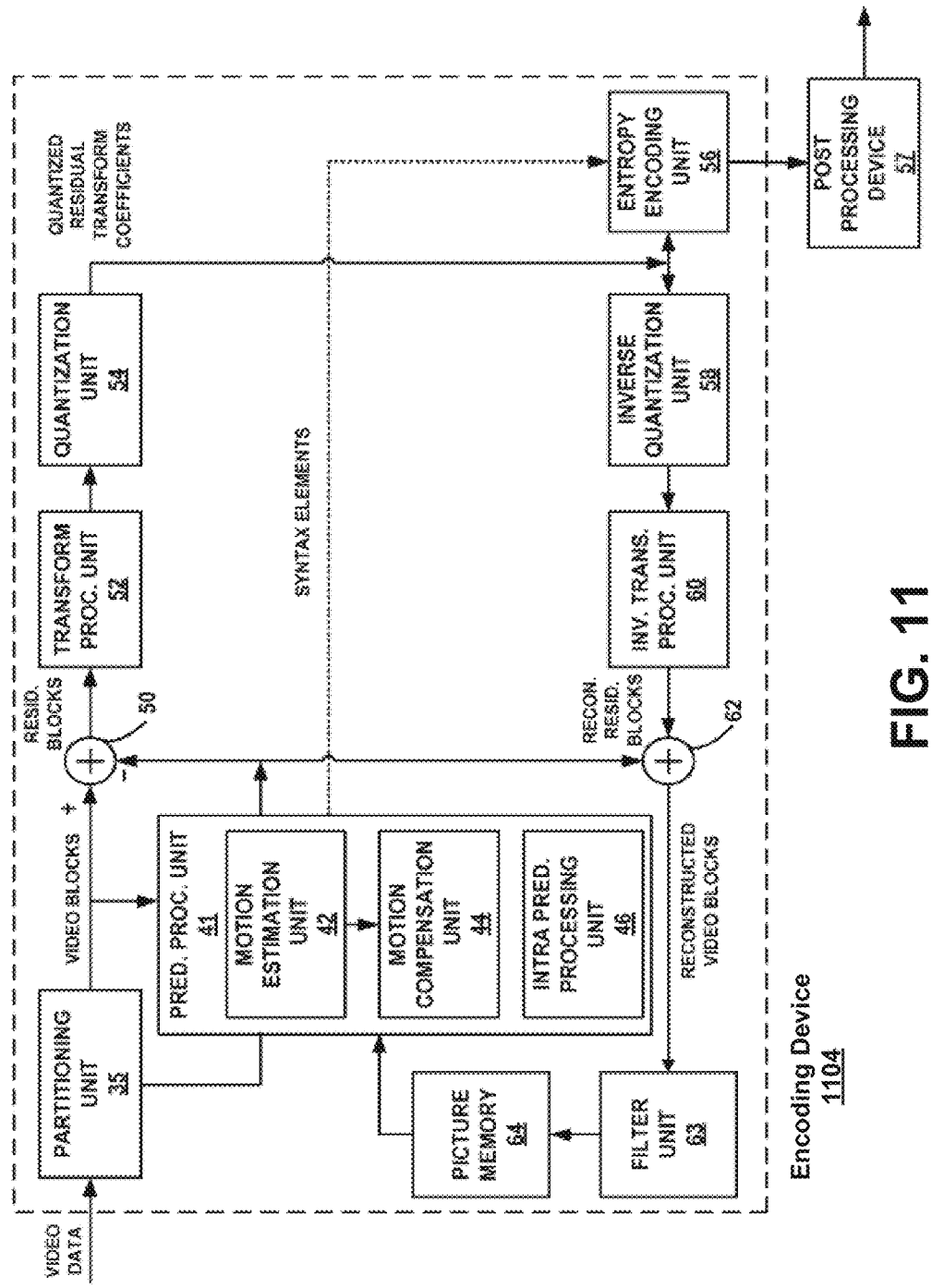
FIG. 11 is a block diagram illustrating an example video encoding device, in accordance with some examples.
Figure 12:
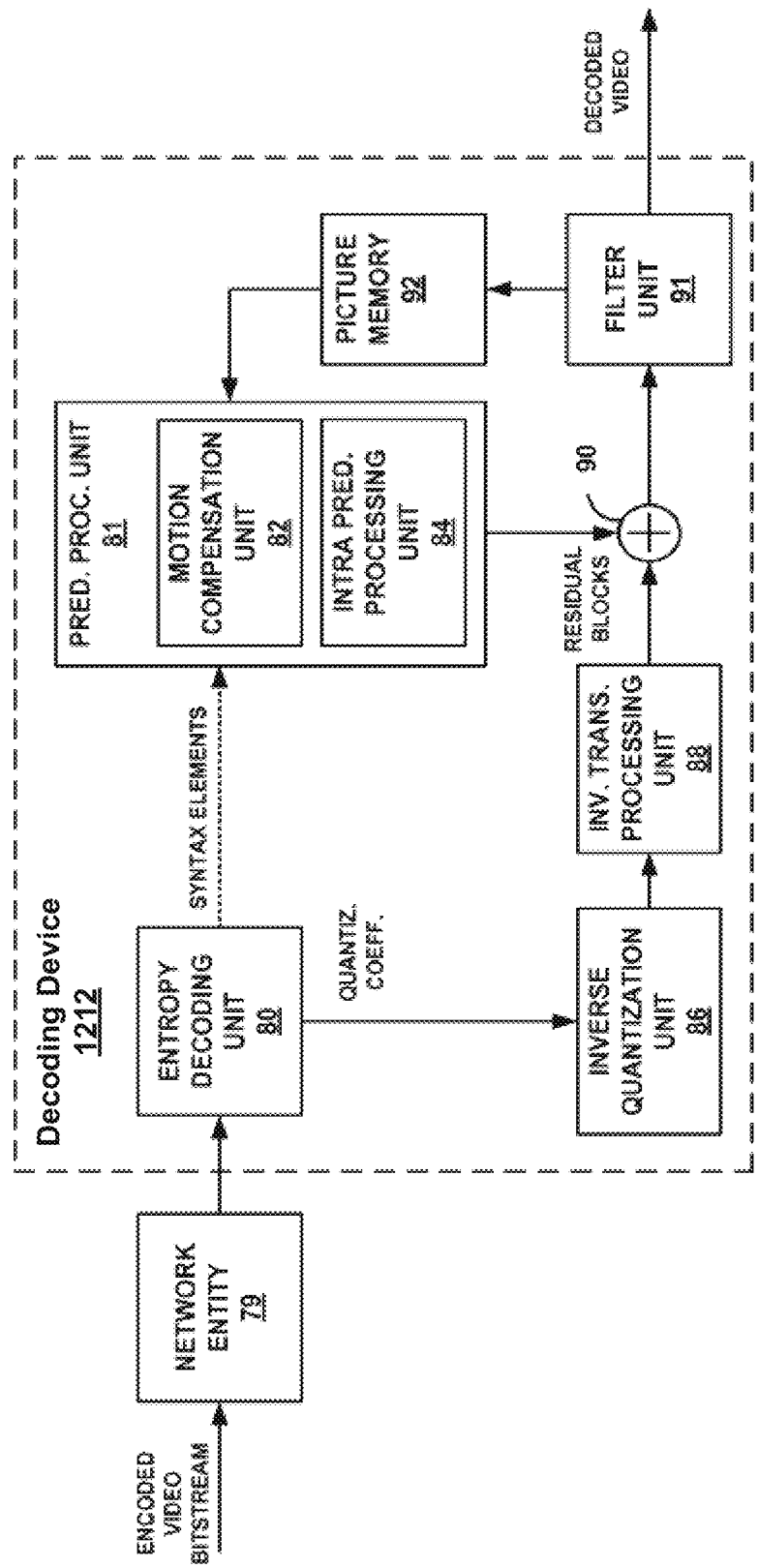
FIG. 12 is a block diagram illustrating an example video decoding device, in accordance with some examples.

Specific details of an encoding device 1104 and a decoding device 1212 are shown in FIG. 11 and FIG. 12, respectively. FIG. 11 is a block diagram illustrating an example encoding device 1104 that may implement one or more of the techniques described in this disclosure. Encoding device 1104 may perform intra-prediction and inter-prediction coding of video blocks within video slices. Intra-coding relies, at least in part, on spatial prediction to reduce or remove spatial redundancy within a given video frame or picture. Inter-coding relies, at least in part, on temporal prediction to reduce or remove temporal redundancy within adjacent or surrounding frames of a video sequence. Intra-mode (I mode) may refer to any of several spatial based compression modes. Inter-modes, such as uni-directional prediction (P mode) or bi-prediction (B mode), may refer to any of several temporal-based compression modes. Encoding device 1104 may also generate syntax structures, such as a video parameter set (VPS), a sequence parameter set (SPS), a picture parameter set (PPS), a combination thereof, or other syntax elements.

The encoding device 1104 includes a partitioning unit 35, prediction processing unit 41, filter unit 63, picture memory 64, summer 50, transform processing unit 52, quantization unit 54, and entropy encoding unit 56. Prediction processing unit 41 includes motion estimation unit 42, motion compensation unit 44, and intra-prediction processing unit 46. For video block reconstruction, encoding device 1104 also includes inverse quantization unit 58, inverse transform processing unit 60, and summer 62. Filter unit 63 is intended to represent one or more loop filters such as a deblocking filter, an adaptive loop filter (ALF), and a sample adaptive offset (SAO) filter. Although filter unit 63 is shown in FIG. 11 as being an in loop filter, in other configurations, filter unit 63 may be implemented as a post loop filter. A post processing device 57 may perform additional processing on encoded video data generated by the encoding device 1104. The techniques of this disclosure may in some instances be implemented by the encoding device 1104. In other instances, however, one or more of the techniques of this disclosure may be implemented by post processing device 57.

As shown in FIG. 11, the encoding device 1104 receives video data, and partitioning unit 35 partitions the data into video blocks. The partitioning may also include partitioning into slices, slice segments, tiles, or other larger units, as wells as video block partitioning, e.g., according to a quadtree structure of LCUs and CUs. The encoding device 1104 generally illustrates the components that encode video blocks within a video slice to be encoded. The slice may be divided into multiple video blocks (and possibly into sets of video blocks referred to as tiles). Prediction processing unit 41 may select one of a plurality of possible coding modes, such as one of a plurality of intra-prediction coding modes or one of a plurality of inter-prediction coding modes, for the current video block based on error results (e.g., coding rate and the level of distortion, or the like). Prediction processing unit 41 may provide the resulting intra- or inter-coded block to summer 50 to generate residual block data and to summer 62 to reconstruct the encoded block for use as a reference picture.

Intra-prediction processing unit 46 within prediction processing unit 41 may perform intra-prediction coding of the current video block relative to one or more neighboring blocks in the same frame or slice as the current block to be coded to provide spatial compression. Motion estimation unit 42 and motion compensation unit 44 within prediction processing unit 41 perform inter-predictive coding of the current video block relative to one or more predictive blocks in one or more reference pictures to provide temporal compression.

Motion estimation unit 42 may be configured to determine the inter-prediction mode for a video slice according to a predetermined pattern for a video sequence. The predetermined pattern may designate video slices in the sequence as P slices, B slices, or GPB slices. Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a prediction unit (PU) of a video block within a current video frame or picture relative to a predictive block within a reference picture.

A predictive block is a block that is found to closely match the PU of the video block to be coded in terms of pixel difference, which may be determined by sum of absolute difference (SAD), sum of square difference (SSD), or other difference metrics. In some examples, the encoding device 1104 may calculate values for sub-integer pixel positions of reference pictures stored in picture memory 64. For example, the encoding device 1104 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in picture memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation, possibly performing interpolations to sub-pixel precision. Upon receiving the motion vector for the PU of the current video block, motion compensation unit 44 may locate the predictive block to which the motion vector points in a reference picture list. The encoding device 1104 forms a residual video block by subtracting pixel values of the predictive block from the pixel values of the current video block being coded, forming pixel difference values. The pixel difference values form residual data for the block, and may include both luma and chroma difference components. Summer 50 represents the component or components that perform this subtraction operation. Motion compensation unit 44 may also generate syntax elements associated with the video blocks and the video slice for use by the decoding device 1212 in decoding the video blocks of the video slice.

Intra-prediction processing unit 46 may intra-predict a current block, as an alternative to the inter-prediction performed by motion estimation unit 42 and motion compensation unit 44, as described above. In particular, intra-prediction processing unit 46 may determine an intra-prediction mode to use to encode a current block. In some examples, intra-prediction processing unit 46 may encode a current block using various intra-prediction modes, e.g., during separate encoding passes, and intra-prediction unit processing 46 may select an appropriate intra-prediction mode to use from the tested modes. For example, intra-prediction processing unit 46 may calculate rate-distortion values using a rate-distortion analysis for the various tested intra-prediction modes, and may select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra-prediction processing unit 46 may calculate ratios from the distortions and rates for the various encoded blocks to determine which intra-prediction mode exhibits the best rate-distortion value for the block.

In any case, after selecting an intra-prediction mode for a block, intra-prediction processing unit 46 may provide information indicative of the selected intra-prediction mode for the block to entropy encoding unit 56. Entropy encoding unit 56 may encode the information indicating the selected intra-prediction mode. The encoding device 1104 may include in the transmitted bitstream configuration data definitions of encoding contexts for various blocks as well as indications of a most probable intra-prediction mode, an intra-prediction mode index table, and a modified intra-prediction mode index table to use for each of the contexts. The bitstream configuration data may include a plurality of intra-prediction mode index tables and a plurality of modified intra-prediction mode index tables (also referred to as codeword mapping tables).

After prediction processing unit 41 generates the predictive block for the current video block via either inter-prediction or intra-prediction, the encoding device 1104 forms a residual video block by subtracting the predictive block from the current video block. The residual video data in the residual block may be included in one or more TUs and applied to transform processing unit 52. Transform processing unit 52 transforms the residual video data into residual transform coefficients using a transform, such as a discrete cosine transform (DCT) or a conceptually similar transform. Transform processing unit 52 may convert the residual video data from a pixel domain to a transform domain, such as a frequency domain.

Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding technique. Following the entropy encoding by entropy encoding unit 56, the encoded bitstream may be transmitted to the decoding device 1212, or archived for later transmission or retrieval by the decoding device 1212. Entropy encoding unit 56 may also entropy encode the motion vectors and the other syntax elements for the current video slice being coded.

Inverse quantization unit 58 and inverse transform processing unit 60 apply inverse quantization and inverse transformation, respectively, to reconstruct the residual block in the pixel domain for later use as a reference block of a reference picture. Motion compensation unit 44 may calculate a reference block by adding the residual block to a predictive block of one of the reference pictures within a reference picture list. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reference block for storage in picture memory 64. The reference block may be used by motion estimation unit 42 and motion compensation unit 44 as a reference block to inter-predict a block in a subsequent video frame or picture.

In this manner, the encoding device 1104 of FIG. 11 represents an example of a video encoder configured to generate syntax for a encoded video bitstream. The encoding device 1104 may, for example, generate syntax for a CRI SEI message, as described above. The encoding device 1104 may perform any of the techniques described herein, such as the process described above with respect to FIG. 10. The techniques of this disclosure have generally been described with respect to the encoding device 1104, but as mentioned above, some of the techniques of this disclosure may also be implemented by post processing device 57.

FIG. 12 is a block diagram illustrating an example decoding device 1212. The decoding device 1212 includes an entropy decoding unit 80, prediction processing unit 81, inverse quantization unit 86, inverse transform processing unit 88, summer 90, filter unit 91, and picture memory 92. Prediction processing unit 81 includes motion compensation unit 82 and intra prediction processing unit 84. The decoding device 1212 may, in some examples, perform a decoding pass generally reciprocal to the encoding pass described with respect to the encoding device 1104 from FIG. 11. The decoding device 1212 may perform any of the techniques described herein, such the process described above with respect to FIG. 10.

During the decoding process, the decoding device 1212 receives an encoded video bitstream that represents video blocks of an encoded video slice and associated syntax elements sent by the encoding device 1104. In some embodiments, the decoding device 1212 may receive the encoded video bitstream from the encoding device 1104. In some embodiments, the decoding device 1212 may receive the encoded video bitstream from a network entity 79, such as a server, a media-aware network element (MANE), a video editor/splicer, or other such device configured to implement one or more of the techniques described above. Network entity 79 may or may not include the encoding device 1104. Some of the techniques described in this disclosure may be implemented by network entity 79 prior to network entity 79 transmitting the encoded video bitstream to the decoding device 1212. In some video decoding systems, network entity 79 and the decoding device 1212 may be parts of separate devices, while in other instances, the functionality described with respect to network entity 79 may be performed by the same device that comprises the decoding device 112.

The entropy decoding unit 80 of the decoding device 1212 entropy decodes the bitstream to generate quantized coefficients, motion vectors, and other syntax elements. Entropy decoding unit 80 forwards the motion vectors and other syntax elements to prediction processing unit 81. The decoding device 1212 may receive the syntax elements at the video slice level and/or the video block level. Entropy decoding unit 80 may process and parse both fixed-length syntax elements and variable-length syntax elements in or more parameter sets, such as a VPS, SPS, and PPS.

When the video slice is coded as an intra-coded (I) slice, intra prediction processing unit 84 of prediction processing unit 81 may generate prediction data for a video block of the current video slice based on a signaled intra-prediction mode and data from previously decoded blocks of the current frame or picture. When the video frame is coded as an inter-coded (i.e., B, P or GPB) slice, motion compensation unit 82 of prediction processing unit 81 produces predictive blocks for a video block of the current video slice based on the motion vectors and other syntax elements received from entropy decoding unit 80. The predictive blocks may be produced from one of the reference pictures within a reference picture list. The decoding device 1212 may construct the reference frame lists, List 0 and List 1, using default construction techniques based on reference pictures stored in picture memory 92.

Motion compensation unit 82 determines prediction information for a video block of the current video slice by parsing the motion vectors and other syntax elements, and uses the prediction information to produce the predictive blocks for the current video block being decoded. For example, motion compensation unit 82 may use one or more syntax elements in a parameter set to determine a prediction mode (e.g., intra- or inter-prediction) used to code the video blocks of the video slice, an inter-prediction slice type (e.g., B slice, P slice, or GPB slice), construction information for one or more reference picture lists for the slice, motion vectors for each inter-encoded video block of the slice, inter-prediction status for each inter-coded video block of the slice, and other information to decode the video blocks in the current video slice.

Motion compensation unit 82 may also perform interpolation based on interpolation filters. Motion compensation unit 82 may use interpolation filters as used by the encoding device 1104 during encoding of the video blocks to calculate interpolated values for sub-integer pixels of reference blocks. In this case, motion compensation unit 82 may determine the interpolation filters used by the encoding device 1104 from the received syntax elements, and may use the interpolation filters to produce predictive blocks.

Inverse quantization unit 86 inverse quantizes, or dequantizes, the quantized transform coefficients provided in the bitstream and decoded by entropy decoding unit 80. The inverse quantization process may include use of a quantization parameter calculated by the encoding device 1104 for each video block in the video slice to determine a degree of quantization and, likewise, a degree of inverse quantization that should be applied. Inverse transform processing unit 88 applies an inverse transform (e.g., an inverse DCT or other suitable inverse transform), an inverse integer transform, or a conceptually similar inverse transform process, to the transform coefficients in order to produce residual blocks in the pixel domain.

After motion compensation unit 82 generates the predictive block for the current video block based on the motion vectors and other syntax elements, the decoding device 1212 forms a decoded video block by summing the residual blocks from inverse transform processing unit 88 with the corresponding predictive blocks generated by motion compensation unit 82. Summer 90 represents the component or components that perform this summation operation. If desired, loop filters (either in the coding loop or after the coding loop) may also be used to smooth pixel transitions, or to otherwise improve the video quality. Filter unit 91 is intended to represent one or more loop filters such as a deblocking filter, an adaptive loop filter (ALF), and a sample adaptive offset (SAO) filter. Although filter unit 91 is shown in FIG. 12 as being an in loop filter, in other configurations, filter unit 91 may be implemented as a post loop filter. The decoded video blocks in a given frame or picture are then stored in picture memory 92, which stores reference pictures used for subsequent motion compensation. Picture memory 92 also stores decoded video for later presentation on a display device, such as a video destination device.

In the foregoing description, aspects of the application are described with reference to specific embodiments thereof, but those skilled in the art will recognize that the invention is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

What is claimed is:

1. A method of processing video data, the method comprising:
   outputting a first video stream the first video stream having a first resolution;
   receiving input corresponding to selection of a location in a first video frame of the first video stream, wherein the input is associated with a request to zoom in on the location in the first video frame;
   determining a region of interest using the first video stream, the region of interest including an area around the location in the first video frame, wherein the region of interest is less than an entire area of the first video frame;

identifying a set of tiles of a second video stream, the set of tiles corresponding to the region of interest, the second video stream having a second resolution, wherein the second resolution is a higher resolution than the first resolution, and wherein the set of tiles include fewer than all tiles within video frames of the second video stream;

enabling receipt of sections of the video frames of the second video stream, the sections of the video frames including the set of tiles and excluding areas of the video frames outside of the set of tiles;

enlarging the sections of the video frames according to a zoom factor; and outputting the enlarged sections of the video frames.

2. The method of claim 1, further comprising:
enabling receipt of a third video stream, the third video stream having a lower resolution than the second resolution and a higher resolution than the first resolution; and
outputting the third video stream after the input is received and until the enlarged sections of the video frames are ready for rendering.

3. The method of claim 1, further comprising:
enabling receipt of a third video stream, the third video stream having a lower resolution than the second resolution and a higher resolution than the first resolution;
extracting from third video frames from the third video stream sections of the third video frames that correspond to the region of interest; and
outputting the sections of the third video frames after the input is received and until the enlarged sections of the video frames are ready for rendering.

4. The method of claim 1, further comprising:
receiving second input corresponding to a request to enable a normal display mode;
enabling receipt of a third video stream, the third video stream having a lower resolution than the second resolution and a higher resolution than the first resolution; and
outputting the third video stream.

5. The method of claim 1, wherein the first video stream has a first frame rate and the second video stream has a second frame rate, wherein the second frame rate is a higher frame rate than the first frame rate.

6. The method of claim 1, wherein the region of interest is described by information including a bounding box and a mapping of the bounding box to the first video frame.

7. The method of claim 1, wherein the request is for enabling an auto-zoom playing mode, wherein, in the auto-zoom playing mode, the enlarged sections of the video frames track the region of interest as the region of interest moves between the video frames.

8. The method of claim 1, further comprising:
outputting the first video stream after the input is received and until the enlarged sections of the video frames are ready for rendering.

9. The method of claim 1, wherein the video frames of the second video stream are coded using tile-based video coding, wherein tile-based video coding divides each of the video frames into a plurality of tiles.

10. The method of claim 9, wherein each tile of the plurality of tiles is arranged in a separate track.

11. The method of claim 1, wherein the set of tiles are associated with a second video frame from the video frames, and further comprising:

identifying a second set of tiles in a third video frame from the video frames, the second set of tiles corresponding to the region of interest with respect to the third video frame, wherein the second set of tiles are different from the set of tiles, and wherein the enlarged sections of the video frames include the second set of tiles.

12. The method of claim 1, further comprising:
identifying an object at the location;
identifying a second region of interest in a second video frame, the second region of interest include an area around a second location of the object in the second video frame; and
identifying a second set of tiles of the second video stream, the second set of tiles corresponding to the second region of interest, wherein the enlarged sections of the video frames include the second set of tiles.

13. The method of claim 1, wherein the first resolution is associated with a first bitrate, and wherein the first bitrate corresponds to an available bandwidth for receiving the first video stream.

14. The method of claim 13, wherein the sections of the video frames are associated with a second bitrate, and wherein the second bitrate also corresponds to the available bandwidth.

15. An apparatus comprising:
a memory configured to store video data; and
a processor configured to:
output a first video stream the first video stream having a first resolution;
receive input corresponding to selection of a location in a first video frame of the first video stream, wherein the input is associated with a request to zoom in on the location in the first video frame;
determine a region of interest using the first video stream, the region of interest including an area around the location in the first video frame, wherein the region of interest is less than an entire area of the first video frame;
identify a set of tiles of a second video stream, the set of tiles corresponding to the region of interest, the target the second video stream having a second resolution, wherein the second resolution is a higher resolution than the first resolution, and wherein the set of tiles include fewer than all tiles within video frames of the second video stream;
enable receipt of sections of the video frames of the second video stream, the sections of the video frames including the set of tiles and excluding areas of the video frames outside of the set of tiles;
enlarge the sections of the video frames according to a zoom factor; and
output the enlarged sections of the video frames of the second video stream.

16. The apparatus of claim 15, wherein the processor is further configured to:
enable receipt of a third video stream, the third video stream having a lower resolution than the second resolution and a higher resolution than the first resolution; and
output the third video stream after the input is received and until the enlarged sections of the video frames are ready for rendering.

17. The apparatus of claim 15, wherein the processor is further configured to:

enable receipt of a third video stream, the third video stream having a lower resolution than the second resolution and a higher resolution than the first resolution;

extract from third video frames from the third video stream sections of the third video frames that correspond to the region of interest; and output the sections of the third video frames after the input is received and until the enlarged sections of the video frames are ready for rendering.

18. The apparatus of claim 15, wherein the processor is further configured to:

receive second input corresponding to a request to enable a normal display mode;

enable receipt of a third video stream, the third video stream having a lower resolution than the second resolution and a higher resolution than the first resolution; and output the third video stream.

19. The apparatus of claim 15, wherein the first video stream has a first frame rate and the second video stream has a second frame rate, wherein the second frame rate is a higher frame rate than the first frame rate.

20. The apparatus of claim 15, wherein the region of interest is described by information including a bounding box and a mapping of the bounding box to the first frame.

21. The apparatus of claim 15, further comprising:
a display for displaying the enlarged sections of the video frames.

22. The apparatus of claim 15, wherein the apparatus comprises a mobile device with a camera.

23. The apparatus of claim 15, wherein the request is for enabling an auto-zoom playing mode, wherein, in the auto-zoom playing mode, the enlarged sections of the video frames track the region of interest as the region of interest moves between the video frames.

24. The apparatus of claim 15, wherein the processor is further configured to:

output the first video stream after the input is received and until the enlarged sections of the video frames are ready for rendering.

25. The apparatus of claim 15, wherein the video frames of the second video stream are coded using tile-based video coding, wherein tile-based video coding divides each of the video frames into a plurality of tiles.

26. The apparatus of claim 25, wherein each tile of the plurality of tiles is arranged in a separate track.

27. The apparatus of claim 26, wherein the set of tiles are associated with a second video frame from the video frames, and wherein the processor is further configured to:

identify a second set of tiles in a third video frame from the video frames, the second set of tiles corresponding to the region of interest with respect to the third video frame, wherein the second set of tiles are different from the set of tiles, and wherein the enlarged sections of the video frames include the second set of tiles.

28. The apparatus of claim 15, wherein the processor is further configured to identify an object at the location;

identify a second region of interest in a second video frame, the second region of interest include an area around a second location of the object in the second video frame; and identify a second set of tiles of the second video stream, the second set of tiles corresponding to the second region of interest, wherein the enlarged sections of the video frames include the second set of tiles.

29. A non-transitory computer-readable medium having stored thereon instructions that when executed by a processor perform a method, comprising:

outputting a first video stream the first video stream having a first resolution;

receiving input corresponding to selection of a location in a first video frame of the first video stream, wherein the input is associated with a request to zoom in on the location in the first video frame;

determining a region of interest using the first video stream, the region of interest including an area around the location in the first video frame, wherein the region of interest is less than an entire area of the first video frame;

identifying a set of tiles of a second video stream, the set of tiles corresponding to the region of interest, the second video stream having a second resolution, wherein the second resolution is a higher resolution than the first resolution and wherein the set of tiles include fewer than all tiles within video frames of the second video stream;

enabling receipt of sections of the video frames of the second video stream, the sections of the video frames including the set of tiles and excluding areas of the video frames outside of the set of tiles;

enlarging the sections of the video frames according to a zoom factor; and outputting the enlarged sections of the video frames.

30. The non-transitory computer-readable medium of claim 29, wherein the first resolution is associated with a first bitrate, and wherein the first bitrate corresponds to an available bandwidth for receiving the first video stream.

* * * * *

UNITED STATES PATENT AND TRADEMARK OFFICE
CERTIFICATE OF CORRECTION

PATENT NO. : 10,313,417 B2
APPLICATION NO. : 15/433763
DATED : June 4, 2019
INVENTOR(S) : Ying Chen et al.

Page 1 of 1

It is certified that error appears in the above-identified patent and that said Letters Patent is hereby corrected as shown below:

In the Claims

In Column 40, Lines 43-44, in Claim 15, after "interest," delete "the target".

In Column 42, Line 36, in Claim 29, delete "resolution" and insert -- resolution, --, therefor.

Signed and Sealed this
Third Day of September, 2019

Andrei Iancu
*Director of the United States Patent and Trademark Office*